US010489968B1

(12) United States Patent
Livingston et al.

(10) Patent No.: US 10,489,968 B1
(45) Date of Patent: Nov. 26, 2019

(54) APPARATUS, METHOD, AND SYSTEM FOR THREE-DIMENSIONAL (3D) VISUALIZATION OF LIGHT FOR EVALUATION OF PLAYABILITY, GLARE, AND GAPS

(71) Applicant: Musco Corporation, Oskaloosa, IA (US)

(72) Inventors: Lance K. Livingston, Arvada, CO (US); Louis E. Parslow, Morrison, CO (US)

(73) Assignee: Musco Corporation, Oskaloosa, IA (US)

( * ) Notice: Subject to any disclaimer, the term of this patent is extended or adjusted under 35 U.S.C. 154(b) by 0 days.

(21) Appl. No.: 15/702,974

(22) Filed: Sep. 13, 2017

Related U.S. Application Data

(60) Provisional application No. 62/394,536, filed on Sep. 14, 2016.

(51) Int. Cl.
  *G06T 15/50* (2011.01)
  *G06T 19/20* (2011.01)

(52) U.S. Cl.
  CPC ........... *G06T 15/506* (2013.01); *G06T 19/20* (2013.01); *G06T 2215/16* (2013.01); *G06T 2219/2012* (2013.01)

(58) Field of Classification Search
  CPC ... G06T 15/506; G06T 19/20; G06T 2215/16; G06T 2219/2012
  See application file for complete search history.

(56) References Cited

U.S. PATENT DOCUMENTS

| | | | |
|---|---|---|---|
| 5,027,307 | A | 6/1991 | Kusmer |
| 5,443,260 | A | 8/1995 | Stewart et al. |
| 5,521,852 | A | 5/1996 | Hibbs et al. |
| 5,768,415 | A | 6/1998 | Jagadish et al. |
| 5,905,503 | A | 5/1999 | Penna |
| 6,463,436 | B1 | 10/2002 | Knoble |
| 6,567,083 | B1 | 5/2003 | Baum et al. |
| 6,983,082 | B2 | 1/2006 | Duiker |
| 7,231,060 | B2 | 6/2007 | Dowling et al. |
| 7,479,961 | B2 | 1/2009 | Yamaguchi et al. |

(Continued)

OTHER PUBLICATIONS

DIAL, "DIALux evo", released on or before Jul. 18, 2015. pp. 1-10. http://en.wiki.dialux.com/index.php/Versionhistory.*
(Continued)

*Primary Examiner* — Chong Wu
(74) *Attorney, Agent, or Firm* — Jessica R. Boer

(57) ABSTRACT

A new lighting design tool is presented whereby existing lighting designs can be modified to produce photorealistic virtual representations of light projected from virtual lighting fixtures (or other virtual light sources). Said photorealistic virtual representations of light are modeled in three dimensions and a user can toggle between evaluation modes (beam based or object based) so to evaluate such issues as playability, glare, and gaps in lighting coverage (as well as the more typical review of spill light, aiming angles, min/max levels, etc.)—in three dimensions, and in a format that provides a strong visual cue to a user so that, in essence, what they see in a virtual lighting design is what they will get in an installed lighting system.

9 Claims, 25 Drawing Sheets
(19 of 25 Drawing Sheet(s) Filed in Color)

(56) References Cited

U.S. PATENT DOCUMENTS

| | | |
|---|---|---|
| 7,500,764 B2 | 3/2009 | Gordin |
| 7,787,710 B2 | 8/2010 | Nakamura et al. |
| 8,523,397 B1 | 9/2013 | Gordin |
| 8,928,662 B2 | 1/2015 | Gordin et al. |
| 9,631,795 B2 | 4/2017 | Gordin et al. |
| 9,706,622 B2 | 7/2017 | Gordin et al. |
| 2002/0177982 A1 | 11/2002 | Boulouednine et al. |
| 2011/0245939 A1 | 10/2011 | Crookham et al. |
| 2012/0050254 A1* | 3/2012 | Gordin .................... G06T 15/50 345/418 |
| 2017/0099715 A1* | 4/2017 | Son .................... H05B 37/0227 |

OTHER PUBLICATIONS

TheDIALux, "DIALux evo—Tutorial for Beginners", published on Mar. 18, 2013. https://www.youtube.com/watch?v=NfnaniX0M5E.*
John Luis, "Dialux 4.12—Lighting Lux Calculating Full", published on Dec. 15, 2016. https://www.youtube.com/watch?v=QBnxnEvLn1w.*
Mehlika N. Inanici and Mojtaba Navvab, The Virtual Lighting Laboratory: Per-pixel Luminance Data Analysis, Oct. 2006, pp. 89-104, Leukos vol. 3, No. 2, The Illuminating Engineering Society of North America.
Musco Corporation, U.S. Appl. No. 14/724,451, filed May 28, 2015, 67 pages.

\* cited by examiner

APPARATUS, METHOD, AND SYSTEM FOR THREE-DIMENSIONAL (3D) VISUALIZATION OF LIGHT FOR EVALUATION OF PLAYABILITY, GLARE, AND GAPS

CROSS-REFERENCE TO RELATED APPLICATIONS

This application claims priority under 35 U.S.C. § 119 to provisional U.S. application Ser. No. 62/394,536, filed Sep. 14, 2016, hereby incorporated by reference in its entirety.

I. TECHNICAL FIELD OF INVENTION

The present invention generally relates to tools for evaluating virtual lighting designs. In the current state of the art of lighting, virtual lighting designs are often created as a first or near-first step in the design process to (i) provide a visualization of what an actual lighting system might look like at a target area, and (ii) at least preliminarily vet aiming angles, spill light, max/min light levels, and numerous other lighting needs which are desired or required to be met. Virtual lighting designs include virtual representations of the field of play (or other target area), poles, lighting fixtures, etc., but also include some kind of virtual representation of the light projected from the virtual lighting fixtures (which corresponds to photometry of the actual lighting fixtures). In the state of the art, virtual representation of light is rudimentary—using number grids, aiming lines, and some basic 3D representation to demonstrate compliance with lighting needs. The present invention specifically relates to improving the virtual representation of light in virtual lighting designs so that such things as playability, glare, and gaps in lighting coverage (i.e., undesirable lighting conditions) might also be evaluated.

II. BACKGROUND OF THE INVENTION

Virtual lighting designs are a critical component of the lighting design process. Generally speaking, the lighting design process begins when a lighting designer or other person surveys an actual target area and models it in a 2D or 3D space. The location of each lighting fixture to be installed is virtually mapped out relative the virtual target area. Some state-of-the-art lighting design software programs have the ability to virtually map out not only the lighting fixtures themselves in space, but also visors, adjustable armatures, and other features (if any). Some state-of-the-art lighting design software programs have the ability to model objects (e.g., furniture, changes in topography) in the virtual space surrounding the virtual target area. These virtual representations match well to their actual counterparts; not so in the case of mapping out and virtually representing the light projected from the virtual lighting fixtures, nor in modifying said virtual representations of light when interacting with said objects in the virtual space.

In most state-of-the-art lighting design software, photometry is measured for the actual lighting fixture and loaded into the software program. In the virtual space previously mentioned, a lighting designer or other person uses the measured photometry in combination with the relative height of the virtual pole, aiming angle of the virtual fixture, and relative location of the virtual target area to determine virtual light levels at the virtual field of play (which should match closely to actual light levels at the actual field of play once the actual lighting system is installed); a similar process is used for indoor lighting applications. For some lighting design software, there is limited ability to render light within a 3D space; often, only a 2D layout of the field of play with numbers overlaid in a grid pattern which indicate relevant photometric values (usually in horizontal footcandles) is possible.

Even those state-of-the-art lighting design software programs which offer some 3D evaluation of virtual lighting designs suffer from a major defect—light projected from the virtual fixtures more or less exists in a vacuum, and is typically only concerned with what is happening at a point at the virtual target area. For example, if an object (e.g., a modeled couch) is proximate the 2D virtual target area (e.g., the target area is the floor of an office and the virtual couch is on the virtual floor of the office), some state-of-the-art lighting design software programs recognize this as an obstruction and can modify the virtual representation of light accordingly (e.g., show a decrease in horizontal footcandles (fc) on the grid where the object exists); the same can be said for an object suspended in space (e.g., a virtual suspended lighting fixture above the virtual floor of the office). However, this analysis is static—only reflecting what is happening point-by-point on the 2D plane of the target area. State-of-the-art lighting design software lacks the ability to evaluate what is happening elsewhere in the 3D space (e.g., how a line of sight might be impacted by said suspended lighting fixture), and has no options for interactivity (e.g., no ability for a user to manipulate said suspended lighting fixture and evaluate not only virtual light levels on the floor of the office, but evaluate how said line of sight is changed). This is but one example of how state-of-the-art virtual lighting design software programs are inadequate in producing accurate virtual representations of light.

Thus, even state-of-the-art lighting design software programs which have some ability to model a 3D space (rather than just a 2D plane), and some ability to model objects in said 3D space, still do not have the ability to take into account the perspective of spectators, players, office personnel, and the like each of which have their own lighting needs which are desired to be met—regardless of whether numbers in the model indicate actual light levels are adequate. Stated differently, while most (if not all) state-of-the-art lighting design software programs are adapted to evaluate well established lighting needs based on well established metrics and relatively objective standards—evaluating such things as aiming angles, spill light, and max/min light levels—none are adapted to evaluate nuanced lighting needs based on subjective input and/or emerging standards/science—evaluating such things as playability, glare, and gaps in lighting coverage (i.e., gaps in a 3D space and not just at a point on a 2D plane).

Consider aerial sports such as baseball. Even if a state-of-the-art lighting design software program was able to model the field, the lighting fixtures, and the space above the field, these software programs, at best, can only evaluate 2D "slices" of virtual light taken repeatedly across the 3D modeled space from a single vantage point (see, for example, FIGS. 3A-E of U.S. Pat. No. 8,523,397 the entirety of which is incorporated by reference herein); and only in terms of meter readings or numeric values. A true 3D evaluation of the virtual representation of light is not possible, and 2D evaluation is not photorealistic (i.e., does not provide a realistic representation of light). Without true 3D evaluation of a virtual lighting design it is nearly impossible to adequately identify where there are gaps in lighting that, among other things, can cause dark spots where the ball is "lost" in flight—a problem for players—and without photorealistic representations of light a consumer or other user has no meaningful feedback, no visual cue as to what the light will actually look like in the installed system.

Consider too that an object in flight (e.g., said baseball) is seen from many different player positions, and that the ball can also be "lost"—even with adequate downlight (i.e., light directed primarily towards a plane (e.g., a playing field))—if the ball is not adequately illuminated over its entire flight, and is another issue for players. This is, of course, in addition to the issue of perceived glare; namely, when a player, spectator, or other person perceives an uncomfortable or disabling brightness when looking at a light source (regardless of whether an object is passing by). Even with the emergence of lighting design software which is adapted to provide photorealistic representations of light and provide a visual cue of when "too much" virtual light has been added—such as that discussed in U.S. Pat. No. 8,928,662 incorporated by reference herein in its entirety—and even with the emergence of real-time evaluation of potential glare sources (albeit actual light sources and not virtual ones)—such as that described in U.S. patent application Ser. No. 14/724,451, issued as U.S. Pat. No. 9,786,251 on Oct. 10, 2017, incorporated by reference herein in its entirety—even those lighting design software programs lack the tools to address an object in flight and situations where the object might be "lost".

Playability, glare, and gaps in lighting coverage are of genuine concern in an installed lighting system (particularly sports lighting systems), and state-of-the-art virtual lighting designs tools fail to adequately model and evaluate them, and thus fail to fully achieve the stated objectives of (i) providing a visualization of what an actual lighting system might look like at a target area, and (ii) at least preliminarily vetting aiming angles, spill light, max/min light levels, and numerous other needs which are desired or required to be met.

Thus, there is room for improvement in the art.

III. SUMMARY OF THE INVENTION

With respect to virtual lighting designs, it is generally understood that the closer a virtual lighting design matches reality, the better the result for the customer; in essence, what they see is what they will get. This means that a realistic rendering of the target area, realistic virtual representations of fixtures (and poles, crossarms, etc.), and realistic virtual representations of light are all critical to delivering an actual lighting system that meets customer expectations (as well as meeting required light levels, loading conditions, etc.). While some state-of-the-art lighting design software programs are adept at modeling a target area, lighting fixtures, poles, etc. in a 3D space, they are not skilled at modeling virtual representations of light projected from said lighting fixtures; this is true for both indoor and outdoor lighting designs. A lack of virtual lighting design tools in this area makes it difficult (if not impossible) to evaluate such things as playability, glare, and gaps in lighting coverage—things which, at their core, may be subjective in observance and/or subject to evolving standards or metrics—as well as making it difficult to evaluate things such as light blockage at a target area—things that benefit from true 3D (as opposed to 2D) analysis.

It is therefore a principle object, feature, advantage, or aspect of the present invention to improve over the state of the art and/or address problems, issues, or deficiencies in the art.

Disclosed herein are apparatus and methods for modeling virtual representations of light as projected from each virtual lighting fixture in a modeled 3D space. Said modeled virtual representations of light are photorealistic and in three dimensions—not numeric data on a 2D plane as with most state-of-the-art lighting design software. A user can orbit around in the modeled 3D space to evaluate gaps in lighting coverage; gaps in 3D space rather than just at a point on a 2D plane as with prior art tools. A user can toggle between different vantage points (e.g., player positions) and be presented with a colored overlay (or other indicia) that shows which luminaire might pose a glare hazard for that vantage point, as well as where an object (e.g., a ball in flight) might be "lost" (i.e., not readily seen). A user can extend the geometry of objects in the modeled 3D space to determine how objects interfere with the light (e.g., whether light is blocked) and vice versa (e.g., whether shadows are cast).

Further objects, features, advantages, or aspects of the present invention may include one or more of the following:

a. evaluating glare in a virtual lighting design from multiple vantage points, with the ability to re-aim virtual lighting fixtures in real time so to, for example, mitigate glare;

b. modeling and illuminating a virtual object in flight relative virtual lighting fixtures, with the ability to show which objects and/or portions of an object are seen from multiple vantage points and along multiple trajectories;

c. modeling a space in a virtual lighting design where virtual objects and/or portions of virtual objects may be lost for a particular vantage point and/or trajectory, and evaluating whether said virtual objects could be seen; and d. modeling both virtual representations of light in all three dimensions within a virtual lighting design and virtual representations of where there are gaps in lighting within said virtual lighting design.

A method according to one aspect of the present invention comprises defining one or more photometric values in accordance with currently known best lighting practices (or from user preference, test data, etc.), producing virtual representations of light, comparing said virtual representations against said defined values, and evaluating a virtual lighting design—in three dimensions within a modeled 3D space—to determine gaps or other deficiencies in lighting, as opposed to (or in addition to) deficiencies at a target area, and for a number of vantage points (e.g., player positions and viewing angles).

An apparatus according to one aspect of the present invention comprises a computing device including at least processor, a user input device adapted to input or select said one or more photometric values, and a display adapted to display said virtual lighting design—including any modifications to the virtual lighting design—in real time.

A system according to one aspect of the present invention comprises said computing device in combination with a software program adapted to perform, at least in part, the aforementioned method; said software program also generally comprising means for extending the geometry of objects in an existing virtual lighting design, means for uploading satellite imagery (if desired), means for uploading photometric information for virtual light sources of the virtual lighting design, means for interpolating and/or extrapolating photometric information based on uploaded photometric information so to produce said virtual representations of light (and enable modifications in real time), means for overlaying photometric information on the satellite imagery (if used), and means for permitting 3D orbiting and toggling between defined positions within said 3D space.

These and other objects, features, advantages, or aspects of the present invention will become more apparent with reference to the accompanying specification and claims.

IV. BRIEF DESCRIPTION OF THE DRAWINGS

From time-to-time in this description reference will be taken to the drawings which are identified by figure number and are summarized below. Furthermore, this application contains at least one drawing executed in color. Copies of this application with color drawing(s) will be provided by the Office upon request and with payment of the necessary fee.

FIG. 1 illustrates one possible method of practicing aspects according to the present invention.

FIG. 2 diagrammatically illustrates layering on a base image so to create a composite image according to at least some aspects of the present invention.

FIG. 3 illustrates one possible apparatus for implementing the method of FIG. 1 so to produce the screenshots of the remaining figures.

FIGS. 4A-C illustrate various screenshots which show various layers of FIG. 2 in accordance with step 1001 of the method of FIG. 1.

FIG. 5 illustrate a screenshot which show various layers of FIG. 2 in accordance with steps 1002 and 1003 of the method of FIG. 1.

FIGS. 6A-C illustrate various screenshots which show toggling between active virtual light sources to evaluate, for example, gaps in lighting.

FIGS. 7A and B illustrate various screenshots which show orbiting within the 3D space to effectuate different views of the virtual representations of light which is useful, for example, in evaluating well established lighting needs such as offsite glare.

FIGS. 8A and B illustrate various screenshots which show different resolutions of the virtual representations of light; here, in beam visibility mode and illustrating candela.

FIGS. 9A and B illustrate various screenshots which show different transparency levels of the virtual representations of light; here, as a result of changing the candela threshold.

FIGS. 10A and B illustrate various screenshots which show different ambient brightness levels which impact overall brightness of the composite image.

Figure 13A:
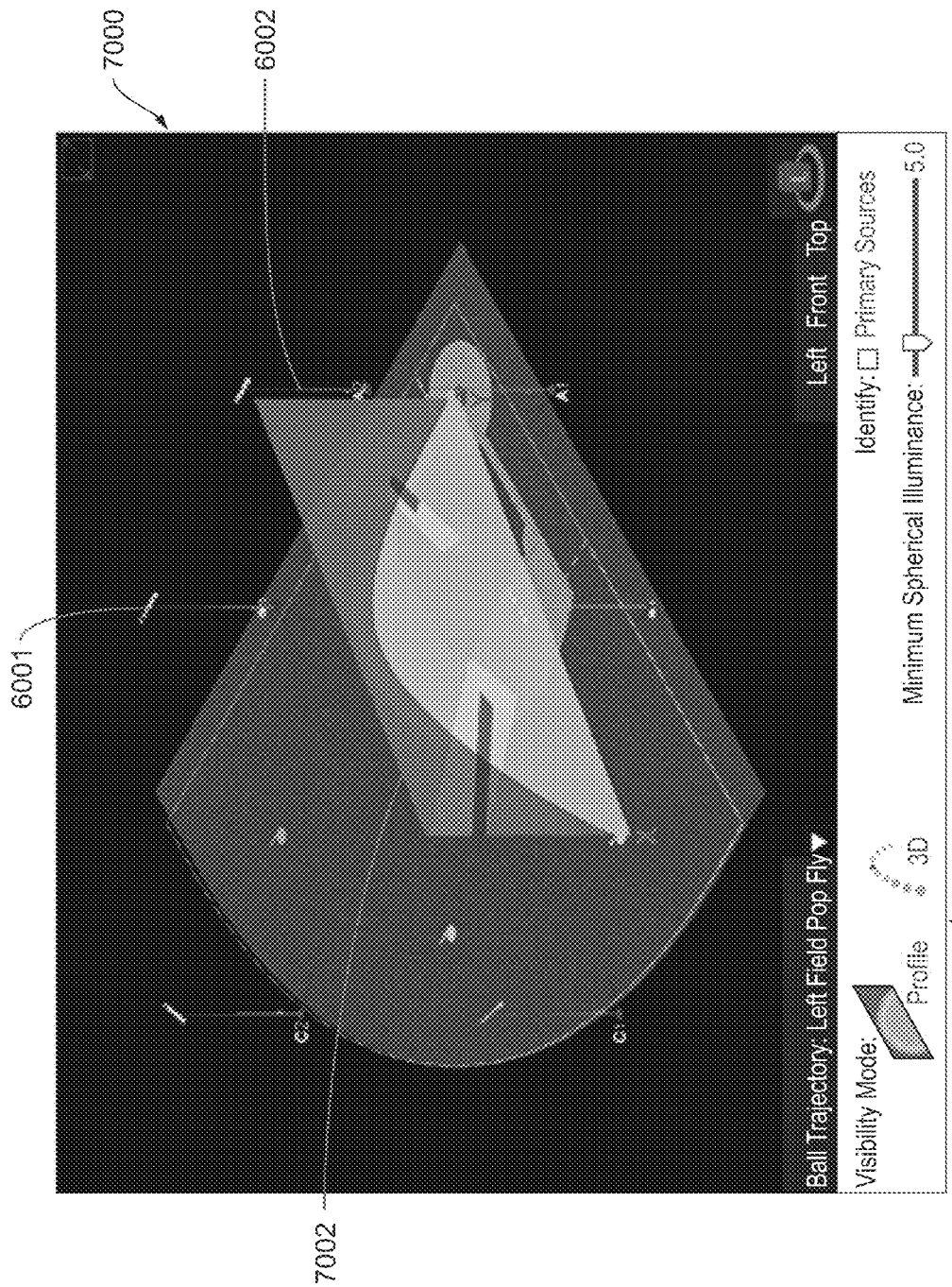
Figure 13B:
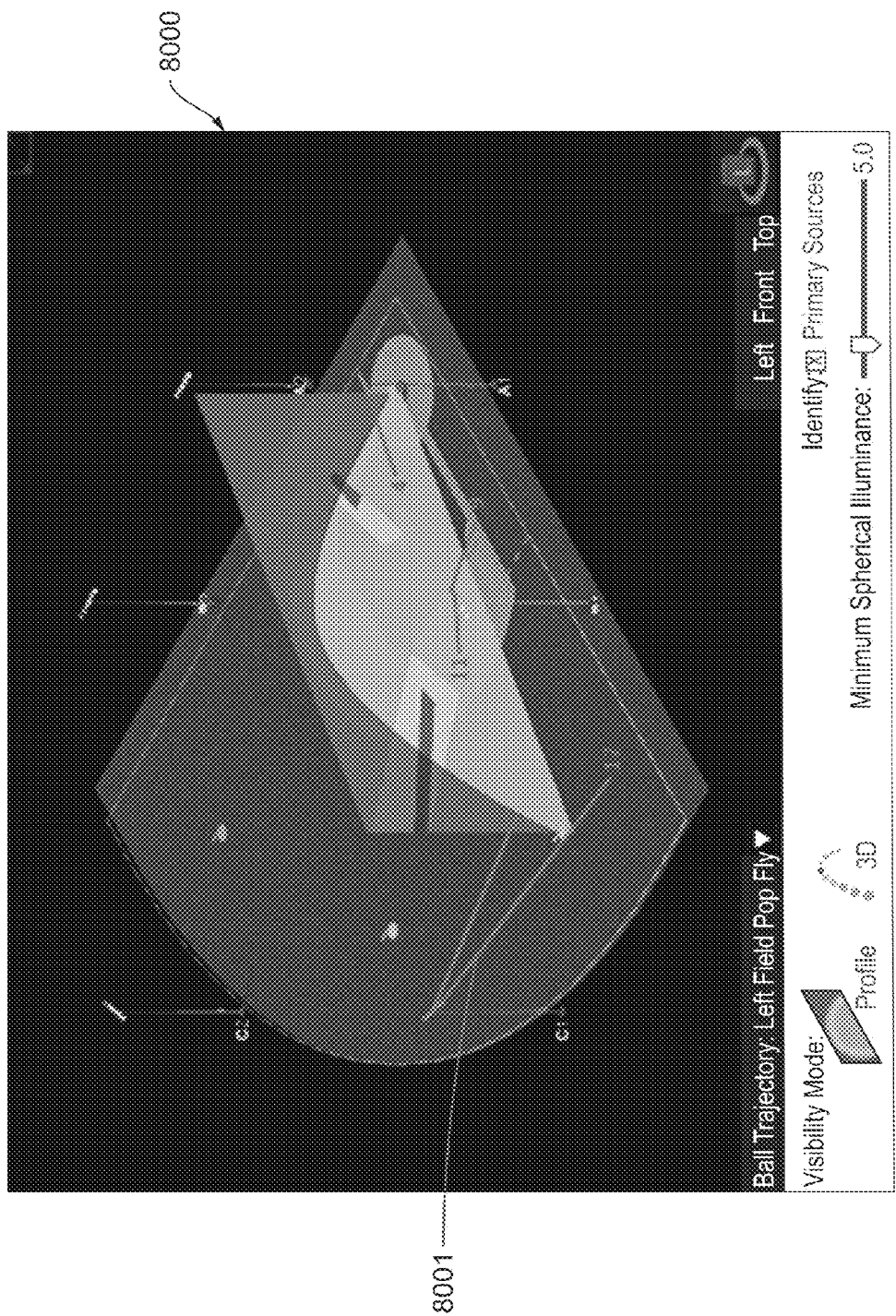

FIGS. 13A and B illustrate various screenshots which show evaluation of playability in object visibility mode. FIG. 13B also illustrates an optional layer on the composite image which is useful, for example, to show sources which contribute to playability; here, in the form of aiming lines relative to the trajectory.

Figure 14:
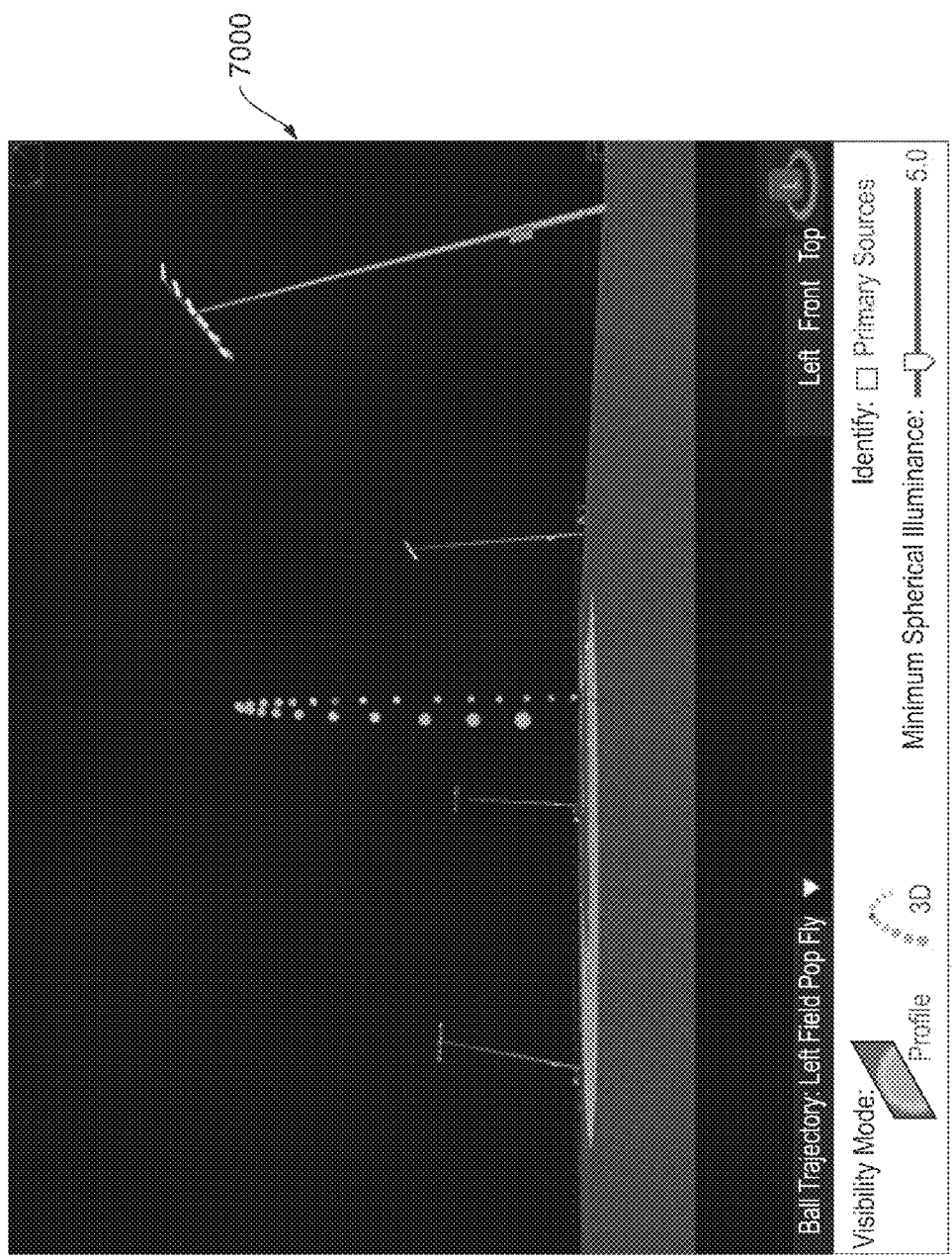

FIG. 14 illustrates a screenshot of an alternative evaluation of playability in object visibility mode; here, in the form of a colored overlay on an object in flight.

FIG. 15A-D illustrate various screenshots of one possible additional feature according to aspects of the present invention; here, a layer to indicate light blockage.

V. DETAILED DESCRIPTION OF EXEMPLARY EMBODIMENTS

A. Overview

To further an understanding of the present invention, specific exemplary embodiment(s) according to the present invention will be described in detail. Frequent mention will be made in this description to the drawings. Reference numbers will be used to indicate certain parts in the drawings. Unless otherwise stated, the same or similar parts are identified by the same reference number (for example, a layer in an image layering process and its corresponding composite image have the same reference number).

Regarding terminology, reference is given herein to "photorealistic" virtual representations of light. As will be seen from the exemplary embodiment(s) set forth, great effort is spent to create a virtual lighting design which closely matches that of an actual lighting system—and this includes presenting virtual light in a way that is similarly perceivable as actual light. In this sense, any visual representation of virtual light (as opposed to numbers on a grid, for example) could be considered photorealistic; although, as will be discussed, if the virtual light has a similar color, transparency, and intensity as the corresponding actual light (or provides a well understood visual cue), the better the tool is for its intended purpose.

Also regarding terminology, reference is given herein to "playability". In the context of the specific embodiment(s) set forth, playability is evaluated with respect to whether or not there is adequate direct light (i.e., illuminance) for a ball to be seen during its entire trajectory within a field of play (i.e., the target area); specific examples are given for a baseball from any standard player position on a baseball field. It is important to note that this is but one way to evaluate playability, and that "playability" is a term of convenience. If, for example, the lighting application is an indoor office, then "playability" is not whether or not a ball in flight can be seen, but perhaps whether an office worker can complete all tasks with adequate visual acuity. In this sense, the term "playability" is intended to encompass any intended task or purpose, and evaluation of playability is intended to encompass any process whereby a user may evaluate the virtual lighting design for ability to engage in said intended task or purpose.

Also regarding terminology, a "target area" is often defined herein as a 2D plane which corresponds to a playing field, and the virtual lighting design tool described herein as being able to evaluate the 3D space above the target area. It is to be understood that the term "target area" encompasses both the 2D plane and the 3D space above it if the lighting application would benefit from such. It is to be further understood that a 3D space can be beside, below, or generally proximate the 2D plane (e.g., a parking lot next to a baseball field), and further, that the target area might not even include a 2D plane as the focus of the target area—for example, the "target area" might solely be a 3D aerial space (e.g., the open space of a high ceiling office space). All are possible, and envisioned.

Also regarding terminology, reference is given herein to various means associated with a computer or computer-like device adapted to operate a lighting design software program according to aspects of the present invention. It should be noted that these terms are used generically to describe various apparatuses, methods, and systems, and are not limiting; for example, a lighting design software program could be operated from a handheld tablet instead of a desktop or laptop. Given the proliferation of computing technology, it is to be understood that a variety of platforms (including, for example, cloud storage of photometry to boost real-time evaluation) is possible, and envisioned.

Also regarding terminology, it has been stated that the present invention is directed to improvements in virtual representations of light in virtual lighting designs so that such things as playability, glare, and gaps in lighting coverage might be evaluated. It is important to note that virtual representations of light are generated, at least in part, from corresponding photometry, and that said photometry might be associated with a single light source, an entire luminaire containing said single light source, a multi-light source luminaire (e.g., an LED luminaire), multiple luminaires which collectively produce a single composite beam, and so on. Some visualizations of light according to aspects of the present invention are candela-based, and present themselves as semi-transparent 3D shapes relative a target area. Some visualizations of light according to aspects of the present invention are illuminance-based, and present themselves as a visible 3D object in the modeled space, or the absence of the 3D object in said space (e.g., due to insufficient direct virtual light thereon), or the trajectory of said 3D object relative virtual representations of light of a virtual light source. All of these approaches to visualizations of light, regardless of whether the virtual lighting design includes one light source or several, one luminaire (also referred to herein as a fixture) or several, candela or illuminance, etc. —all are contemplated by the present invention.

Lastly regarding terminology, reference is given herein to "user(s)", "lighting designer(s)", "consumer(s)", and the like; it is important to note these terms are used by way of example and not by way of limitation. None of the aforementioned terms are intended to limit those who may practice or benefit from aspects according to the present invention.

The exemplary embodiment(s) envision a lighting design software program which in at least one form is, in essence, an improvement to existing lighting design software. While it is entirely possible to build a lighting design from scratch according to aspects of the present invention, it is more likely that an existing lighting design (e.g., an already developed wireframe model together with photometry) will be uploaded to a computer-like device and modified according to aspects of the present invention. To permit real-time evaluation and re-aiming of virtual lighting fixtures, it is desirable if said photometry includes a sufficient number of files at a range of aiming angles so to permit interpolation according to IES standard LM-63 (which, as will be discussed, is included in the various calculations associated with the envisioned software program), though this is by way of example and not by way of limitation.

A number of screenshots from different versions of said software program will also be presented; the relative elevation, viewpoint, proximity to target area, etc. are all selectable. A user can (e.g., via a user input device such as a mouse) orbit freely within the 3D modeled space of the envisioned lighting design software. Alternatively, and as will be discussed, certain player positions, sight lines, ball trajectories, etc. could be preset and available for evaluation. It is to be understood that toggling between viewpoints, freely orbiting within a 3D space, setting specific viewpoints and sight lines, etc. are all considered well within the grasp of one of average skill in computer design; this is likewise true for one of average skill in the art of lighting design with respect to such things as player position, common sight lines and viewing angles, size of an object in flight, common trajectories, etc. Though some specific examples will be given, it is to be understood that all of the aforementioned should already be well known to one of average skill in the art.

A more specific embodiment, utilizing the general examples and information above, will now be discussed.

B. Exemplary Method and Apparatus Embodiment 1

Figure 1:
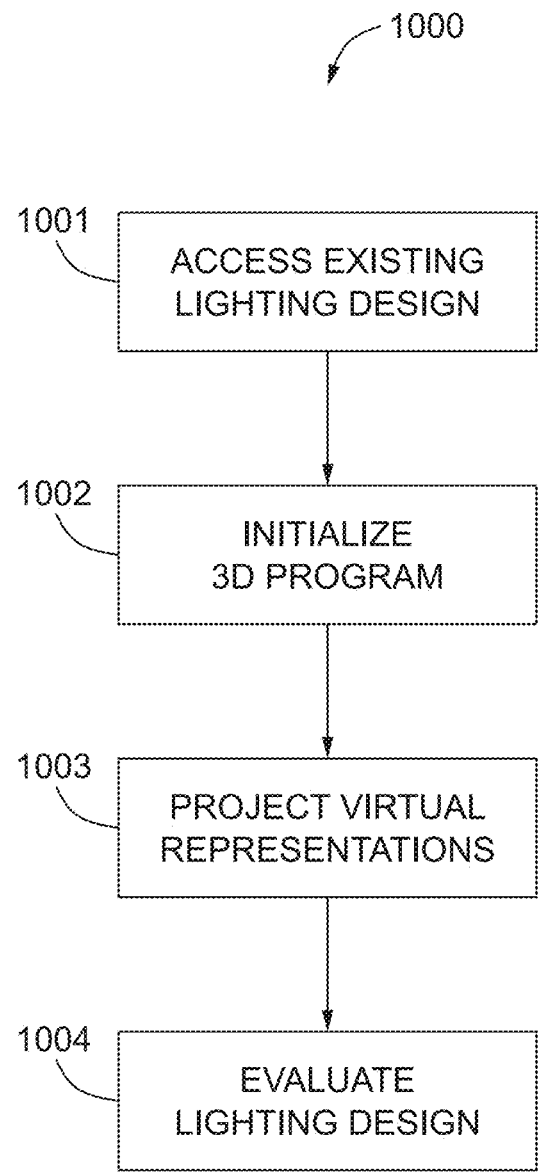
Figure 4A:
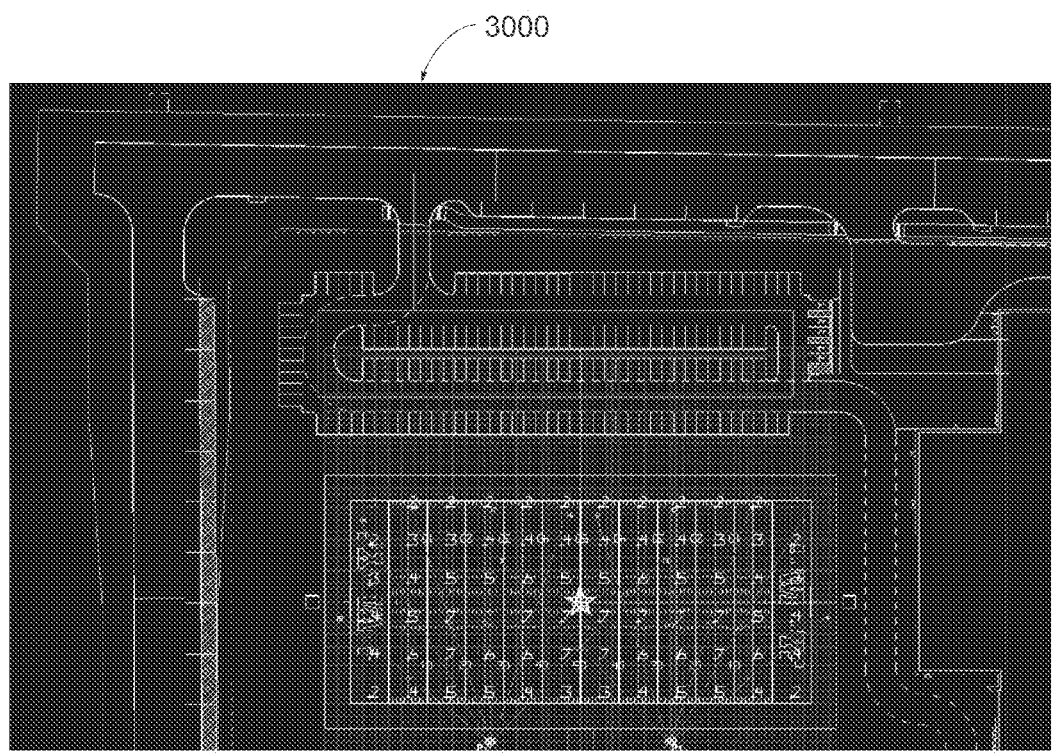
Figure 4B:
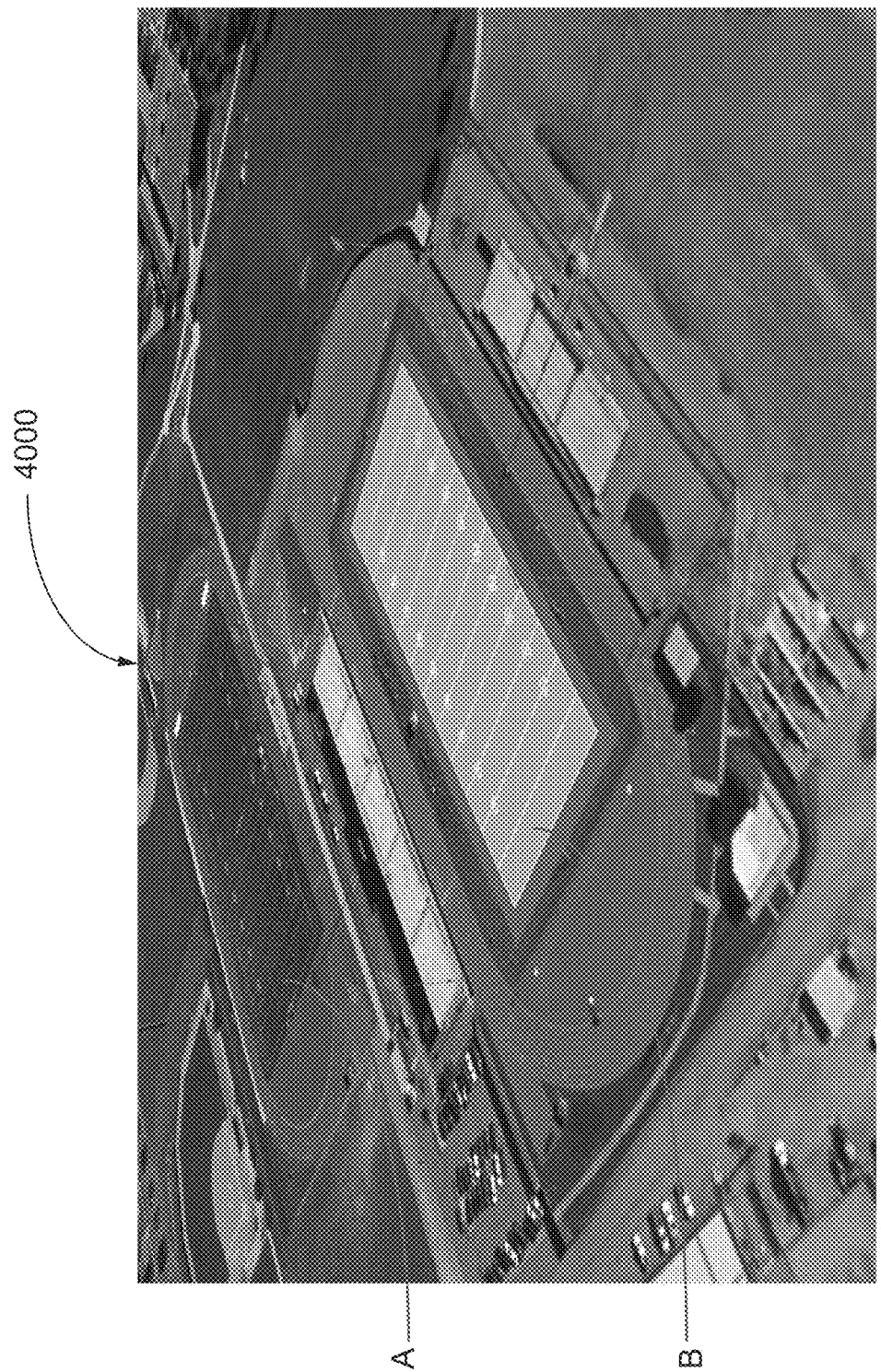
Figure 4C:
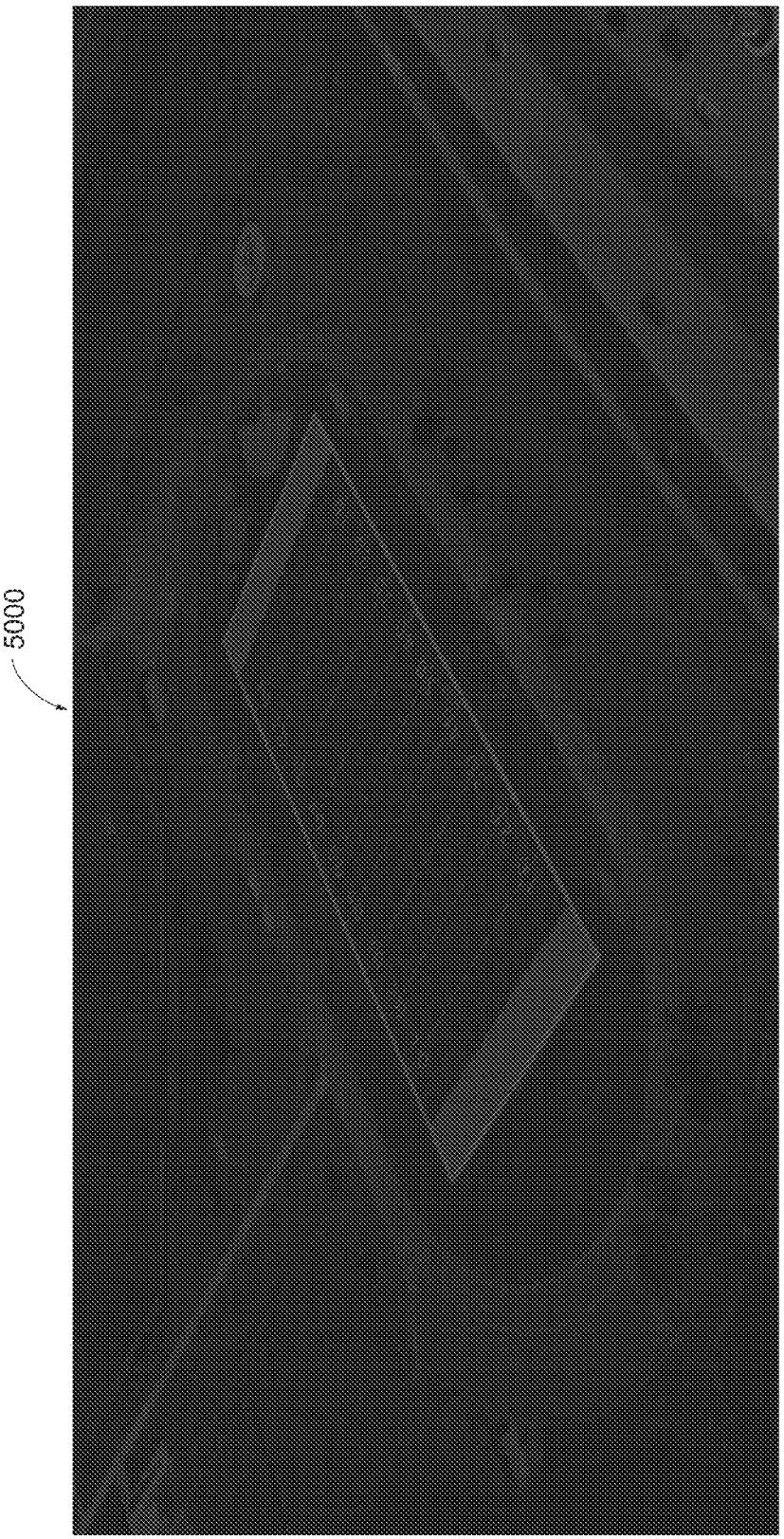

Aspects according to the present invention are perhaps best understood when describing first the underlying methodology. According to FIG. 1, a method 1000 of producing photorealistic virtual representations of light to evaluate playability, glare, and gaps in lighting coverage (and/or other less subjective lighting needs such as, e.g., max/min, spill light, etc.) includes a first step 1001 of accessing photometry, wireframe models, and (if desired) uploading satellite imagery to build the virtual target area (i.e., the base image) and, more broadly, build the 3D space. Alternatively (or in addition), preexisting lighting designs including pole locations, aiming points, etc. —such as may be described in U.S. Pat. No. 7,500,764 the entirety of which is incorporated by reference herein—could be used. Photometry most typically exists as .ies files, and their generation is standardized and governed by IES LM-63 (for most countries). Wireframe models (3000, FIG. 4A) are also well known in the art and readily generated with commercially available software (e.g., AutoCAD® software available from Autodesk, Inc., San Rafael, Calif., USA) to flesh out the target area. The 3D space itself could be as large or as small as desired; if offsite glare is being evaluated, or if the lighting application is for an aerial sport, it may be desirable to include significant 3D space surrounding the virtual target area. If desired, it may be beneficial to include a satellite image of the target area in accordance with step 1001; as previously stated, it is generally understood that the closer a virtual lighting design matches reality, the better the result for the customer—and so there is a benefit to creating a layer within the modeled space that illustrates actual features of the target area and/or surrounding area (i.e., provides real-world context). FIG. 4B illustrates a satellite image 4000 which can be layered with the wireframe model (see FIG. 2) to create a photorealistic 3D space; if desired, the target area can be highlighted (note how field B of FIG. 4B is perceivably brighter than field A). Highlighting of target areas can be achieved via an additional layer, or direct modification of the satellite image (e.g., via Photoshop® software available from Adobe Systems Incorporated, Seattle, Wash., USA); either approach to image highlighting is well known in the art, and can be used to add color, improve readability of indicia (e.g., yard markers), etc. Most wireframe models 3000 include some kind of location information (e.g., latitude, longitude, bearing) which can used by any modern day geocoding programs (e.g., Google Maps™ mapping service available from Google, Inc., Mountain View, Calif., USA) to find a suitable publicly available satellite image. If further desired, another layer 5000 (FIG. 4C) can be added to create the appearance of a nighttime scene (e.g., using the same approaches as in the highlighting of the target area) by, in essence, darkening the composite image (i.e., the base image together with the aforementioned layers) to give the perception of darkness.

Figure 3:
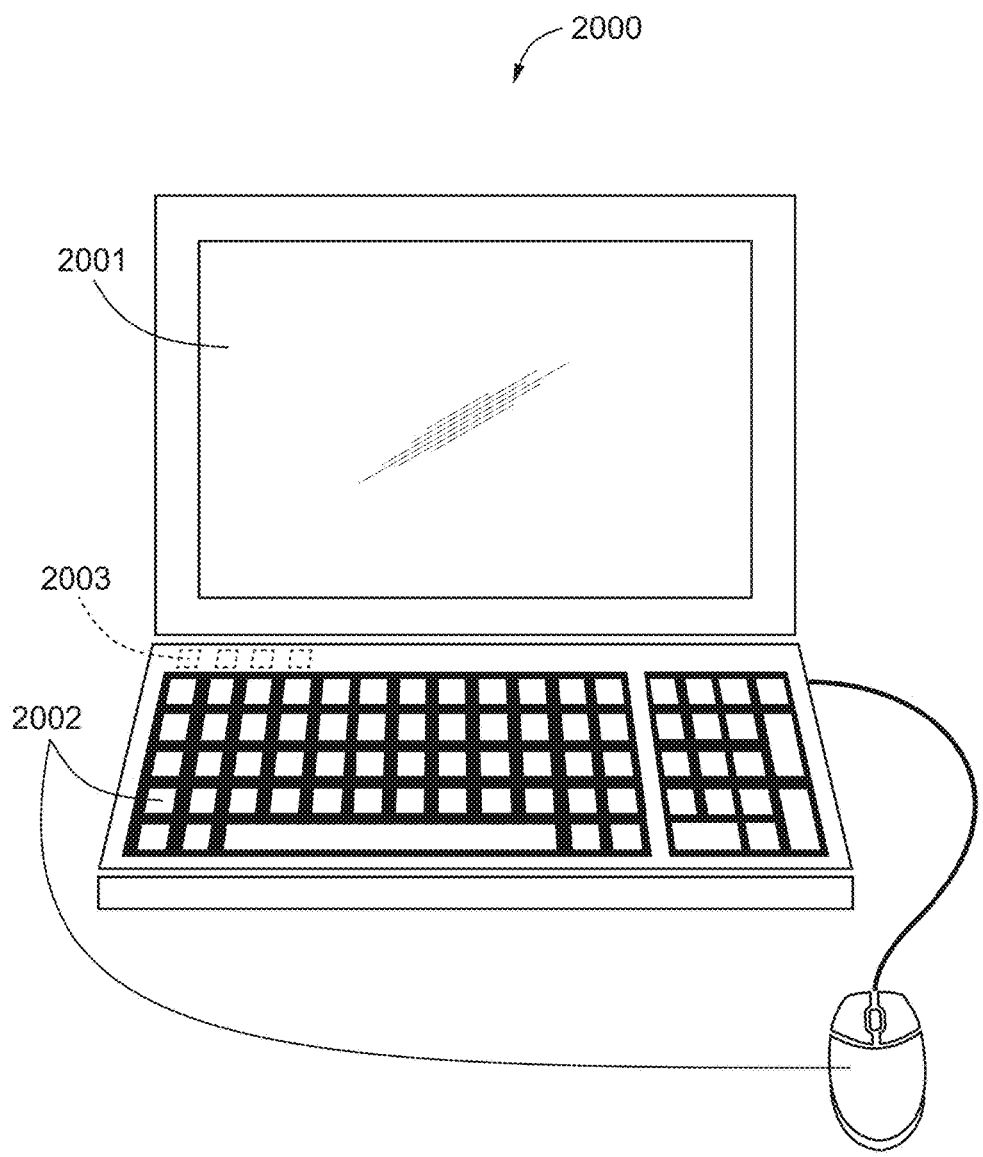

All of the aforementioned is generally considered part of step 1001 of method 1000 and, according to one example, may be implemented on a general purpose computer 2000 (FIG. 3) including a display 2001, user input devices 2002, and processor, operating system, framework, memory, and any other components (collectively, reference no. 2003) which are needed or desired to be included to fully implement method 1000. It should also be noted that regardless of the apparatus used, if a pre-existing lighting design is used in step 1001 that the values be at least preliminarily vetted for the lighting application—that the tolerances, values, etc. make sense for the application given the many standards and base knowledge in the art.

Figure 2:
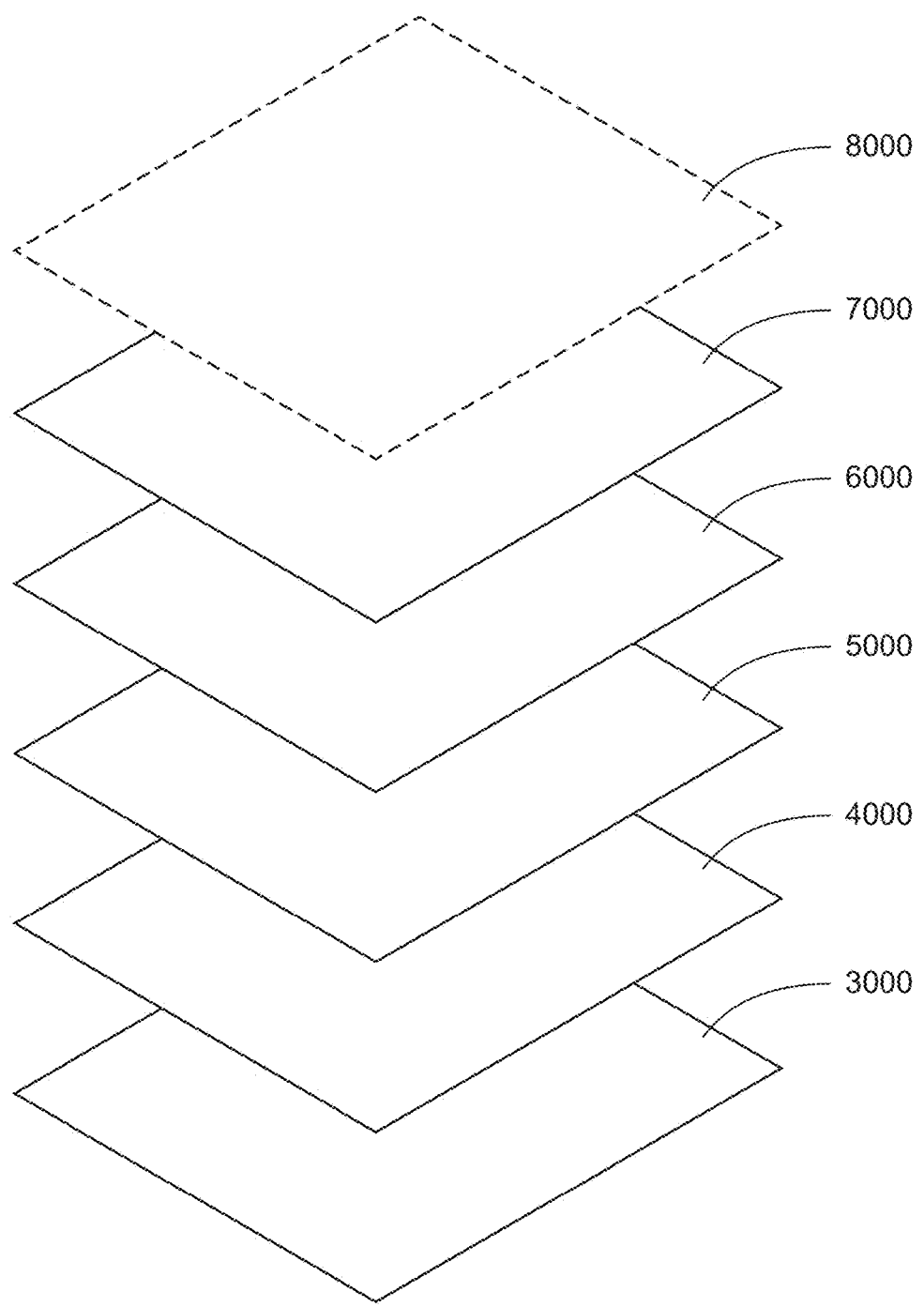
Figure 5:
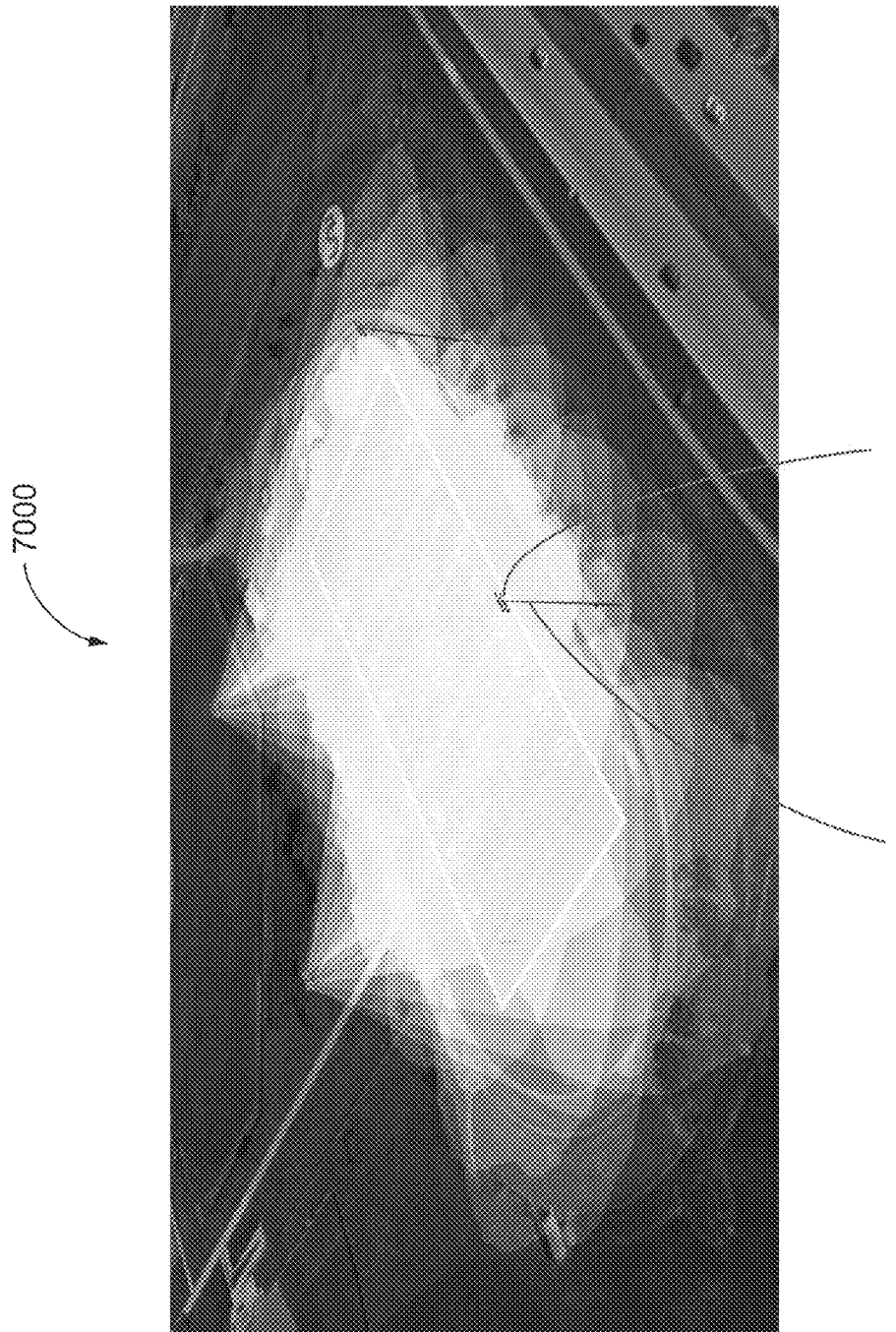

What is essentially a composite 2D image within the 3D modeled space is fleshed out in all three dimensions according to step 1002 by initializing the 3D extension (layer 6000, FIG. 2). Each virtual light source in each array of light sources (6001, FIGS. 5 and 13A) is modeled and oriented in the 3D space; position information could be generated from information in the preexisting lighting design of step 1001 (if available), or calculated on the fly (e.g., from survey data). Calculation on the fly may be needed for such things as scoreboards and other objects which might block light but were never added in the pre-existing lighting design (as is often the case in real-world lighting applications). Each virtual light source is elevated in the 3D space via a virtual pole (6002, FIGS. 5 and 13A) or other structure the geometry of which has been extended (e.g., using a standard vector-algebra approach, or otherwise). Geometry extension is important because it aids in providing a virtual lighting design which more closely matches reality (and can more accurately evaluate blockage of light, later discussed); principles of such are described in aforementioned incorporated by reference U.S. Pat. No. 8,928,662, as are principles of modeling (also referred to as rendering) basic photorealistic representations of light.

The precise look of the composite image after layer 6000 will depend upon which mode is selected according to step 1003 of method 1000; namely, a beam visibility mode (a candela-based virtual representation), or an object visibility mode (an illuminance-based virtual representation). Both modes provide a virtual representation of light (i.e., either the light itself, or light on an object), and both will be discussed in detail.

Step 1003—Beam Visibility Mode

In beam visibility mode light is allowed to, in a sense, reveal itself to a user. The darkened scene of FIG. 4C appears to be illuminated (see FIG. 5) by the layering of multiple, semi-transparent, 3D virtual representations of light; as can be seen, the focus is very much on the light itself (rather than, for example, the target area). Each virtual light source 6001 has an associated virtual representation of light, the 3D shape of which is most often a cone but is ultimately dependent upon the photometry associated with the virtual light source. Each added virtual light source adds another semi-transparent virtual representation of light to the composite image thereby, in essence, reducing transparency in areas where the added layers overlap. In this sense, an area in the virtual lighting design with more light (e.g., with several sources aimed towards the area) will appear more saturated than an area with less light. A yellowish hue was chosen for the virtual representations of light because it was found from internal testing that this provided the strongest visual cue to a user that the virtual target area was being "lit"; this, of course, could differ (particularly with the emergence of LEDs and other lighting which offer a variety of color temperatures).

Step 103—Object Visibility Mode

In object visibility mode both an object and an object's trajectory is the focus of the lighting design tool (rather than, for example, the light itself as in the previous mode). As can be seen from FIGS. 13A-14, in object visibility mode a user has the option of operating in a profile mode or a 3D mode so to best view the modeled trajectory or object, respectively; see corresponding portions of user interface 7001 which could be selected, for example, via user input devices 2002 previously discussed. With respect to FIG. 13A, a user selects a player or other position (which can be preset using common knowledge, guidance from lighting standards (e.g., IES standard RP-6-15), or otherwise) at the target area from which the object will originate, and selects a player or other position where the object will generally end its flight; here, a ball batted at home plate (i.e., point Y) towards left field (i.e., point X). If a pre-existing lighting design was used in step 1001 of method 1000, then the size of the field, size of the object, shape of the object, and general player position is already known (and can be readily accessed within the software from, for example, a lookup table); otherwise, such values can be determined by user preference, internal testing, etc. For example, for a baseball, it is generally understood that a common trajectory is parabola-based—see publicly available trajectory calculators such as that at http://baseball.physics.illinois.edu/trajectory-calculator.html which could be used in method 1000—but specialized equations for modeling trajectory within the modeled 3D space could be used. Ultimately, the more equations, lookup tables, preset positions, and the like that can be loaded into the envisioned lighting design tool, the more readily it will provide real-time evaluation and adjustment.

In the profile view (see FIG. 13A), if the object can be seen from the end point (i.e., point X) along the line-of-sight defined by the trajectory (i.e., across parabola 7002 towards home plate) the profile view is colored green; yellow if only a portion of the object can be seen under these conditions, and red if the object cannot be seen under these conditions. Green, yellow, and red hues were selected because they provide a common visual cue for a user; namely, that green is safe to proceed, yellow advises caution, and red suggests it may not be safe to proceed. The threshold for whether or not the ball can be seen—and the divisions between red, yellow, and green—is derived from internal testing and evolving advancements in understanding of human perception, onsite adaptation, and lighting science in general—but is currently set at under 5 fc being red, 5-10 fc being yellow, and above 10 fc being green. It was decided that unlike most commercially available illuminance meters that only calculate a composite horizontal illuminance from all available light sources, hemispherical illuminance would be calculated from all available virtual light sources within the profile view (i.e., within the rectangular window of FIGS. 13A and B); this is important because nearly all objects in flight in an actual lighting application have some curvature, and so a more realistic virtual lighting design is one in which modeled objects have curvature. Hemispherical illuminance calculations are known in more advanced areas of lighting design and lighting engineering; the particular formula used is shown below.

$$\text{Average hemispherical illuminance} = (E_{max}/4)*(1+\cos\phi) \quad \text{Equation 1}$$

where: $E_{max}$=flux incident on the curved surface (as determined from the associated photometry)

$\phi$=angle between the incident flux vector (from the source) and the vector to the observer (player) from the point The same thresholds and coloring schemes are used in the color coding of a modeled object in FIG. 14. As can be seen, FIG. 14 illustrates an alternative view in object visibility mode—one in which the object (here, a ball) is modeled at various points along the defined trajectory and colored in accordance with the illuminance thresholds as seen from the defined observer's viewpoint (here, the left fielder's position looking towards home plate) within the modeled 3D space. In practice, any number of colors or modeled objects across the trajectory could be used.

Regardless of the mode chosen in step 1003 of method 1000, according to a final step 1004 of method 1000 the virtual lighting design may be evaluated—this includes the option of adding an additional layer (8000, FIG. 2) which permits a user to readily identify important virtual light sources (later discussed)—and, if need be, virtual lighting fixtures may be re-aimed, added, etc. so to achieve the aforementioned lighting objective of (i) providing a visualization of what an actual lighting system might look like at a target area, and (ii) at least preliminarily vetting aiming angles, spill light, max/min light levels, and numerous other needs which are desired or required to be met. As envisioned, photometry is based on luminaires which include independently positionable visors—see, for example, U.S. Pat. No. 9,631,795 the entirety of which is incorporated by reference herein—such that photometry can be collected at a variety of visor positions (i.e., the visor is part of the fixture in terms of photometry), and linear interpolation can be used (e.g., according to IES standard LM-63) to predict unique virtual representations of light 7001 based on visor positions not in the collected set—which has demonstrated accuracy down to $1/10^{th}$ of a degree. This aids greatly in real-time re-aiming and evaluation because calculations are fast and accurate. Also, because the composite image (FIG. 2) is the result of layers added to a base image any orbiting or toggling between points (e.g., via input devices 2003) can be done in real time—rather than having to wait while images are re-processed (as in some prior art systems). However, even if real-time or near real-time evaluation of the virtual lighting design is not possible or needed, a number of other options and features are possible according to step 1004, and beneficial in evaluating a virtual lighting design.

Figure 6A:
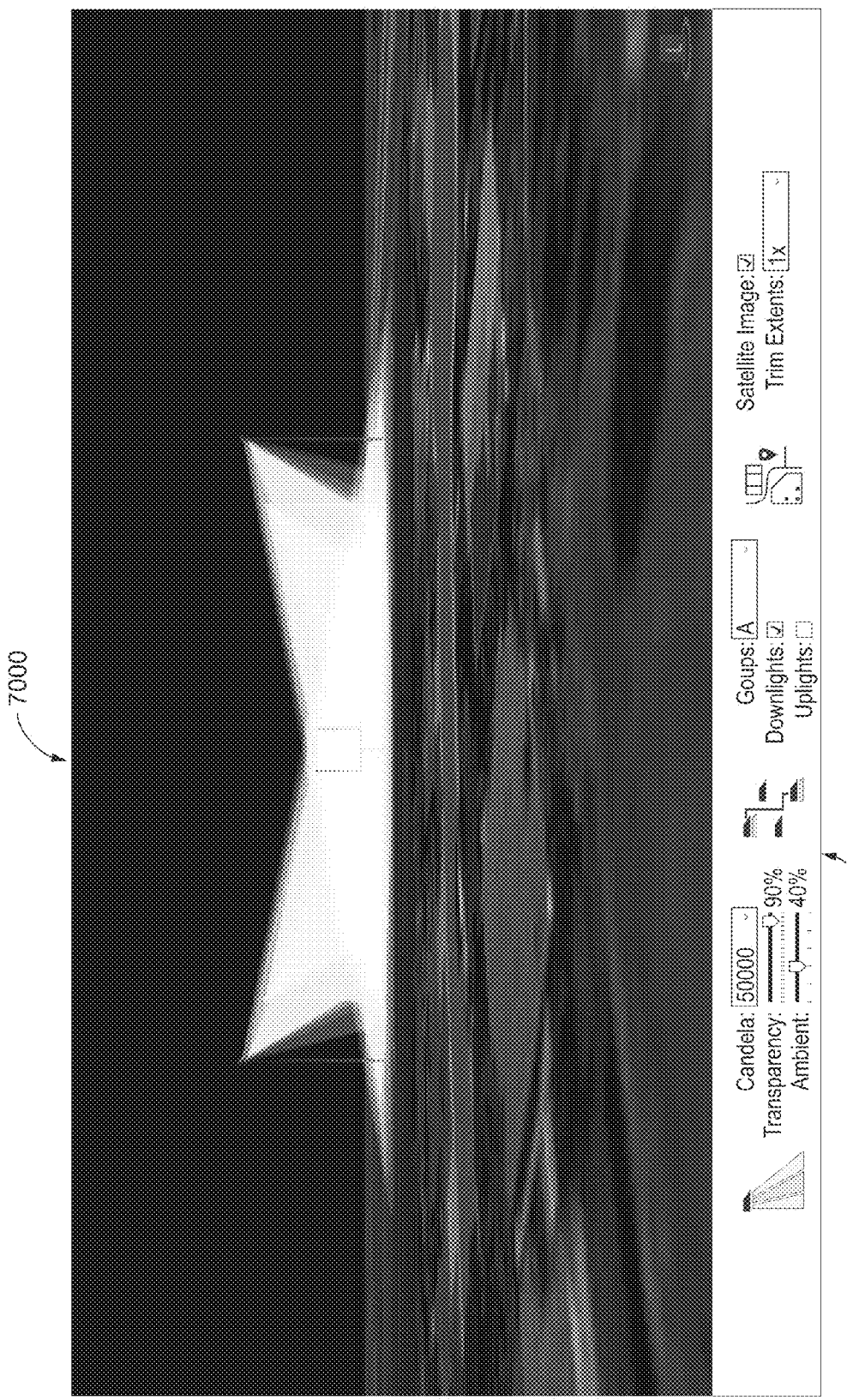
Figure 6B:
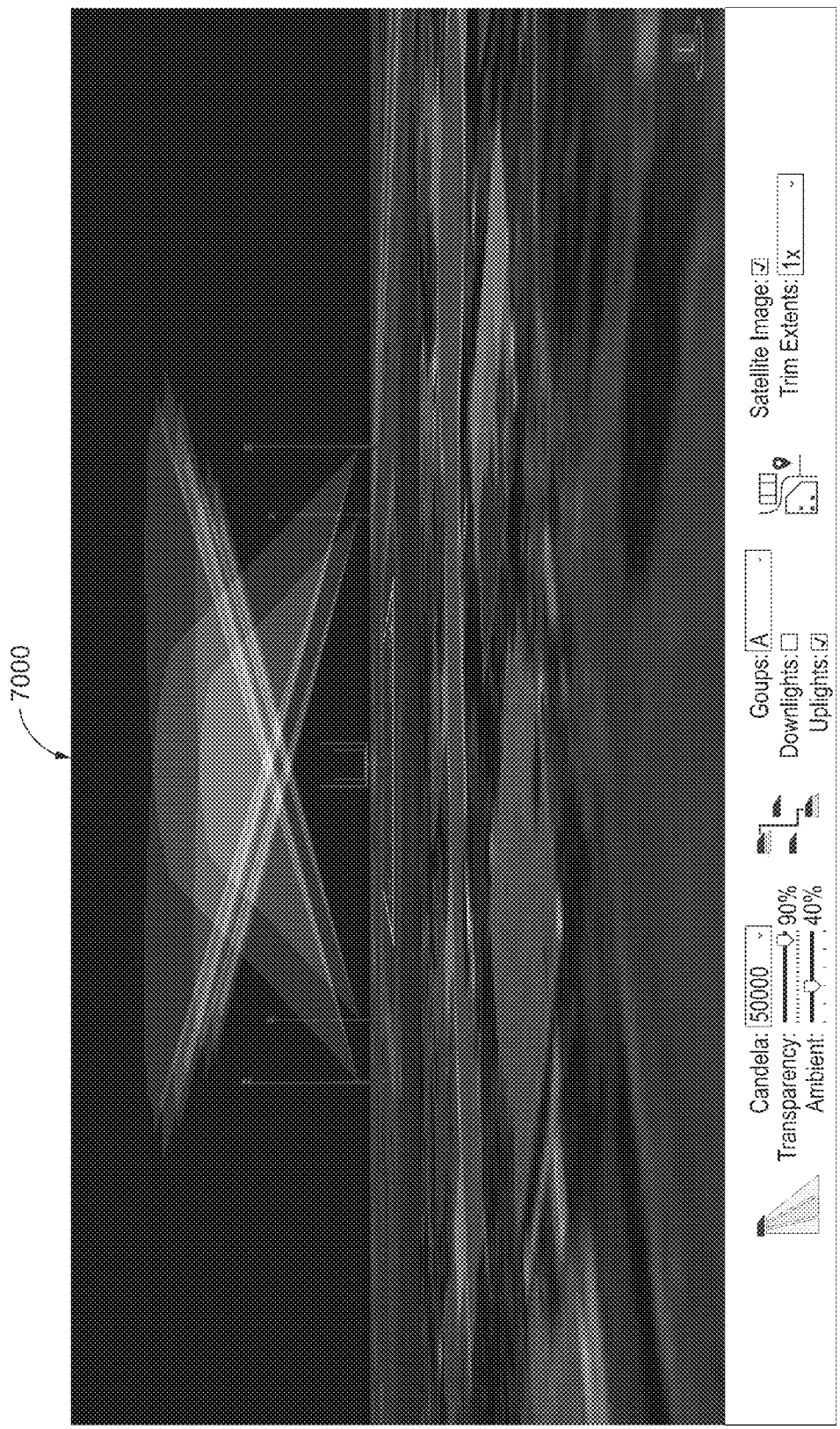
Figure 6C:
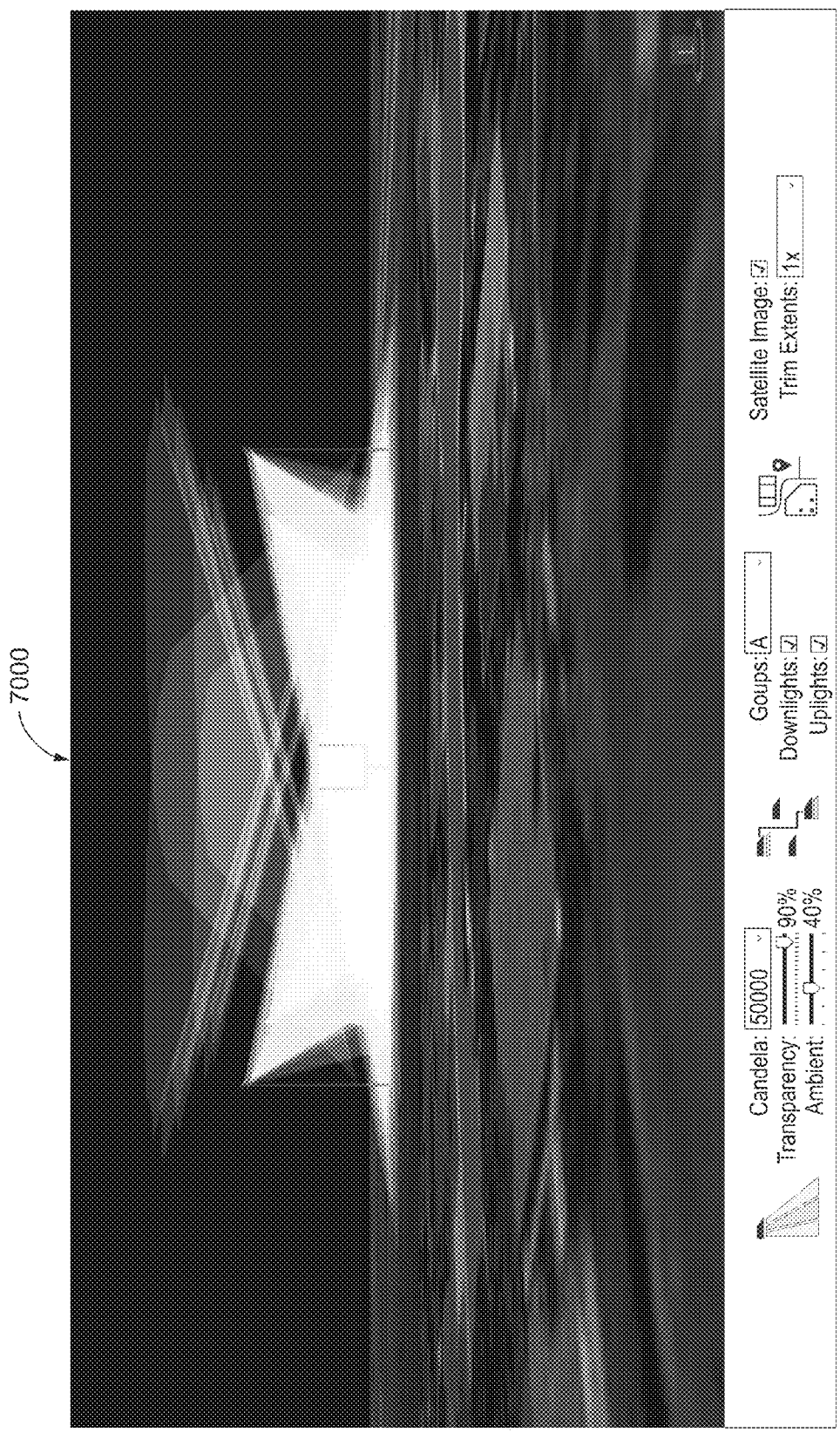
Figure 12:
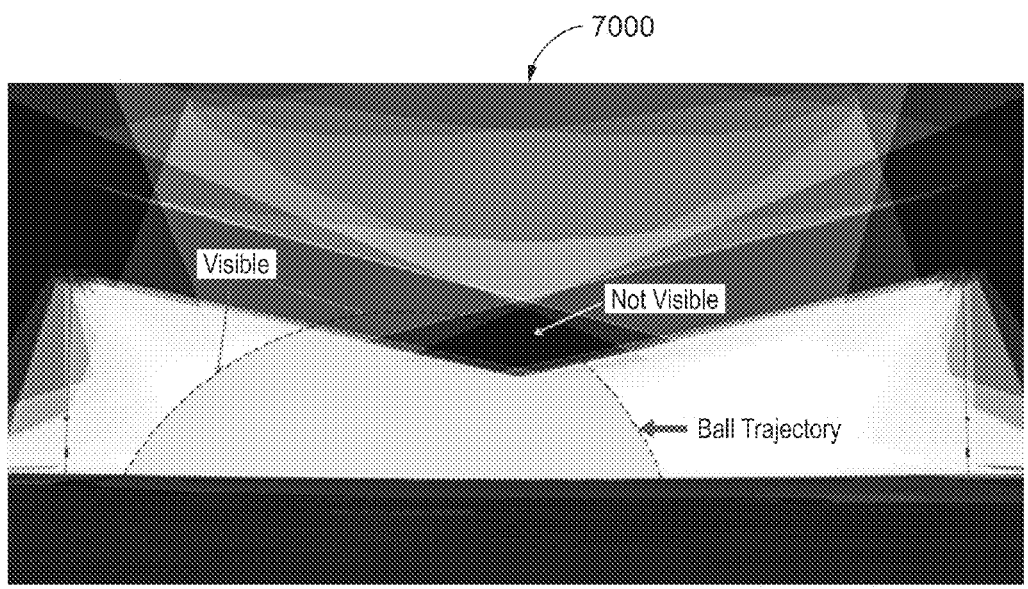
FIG. 12 illustrates a screenshot which shows evaluation of playability in beam visibility mode.

FIGS. 6A-C, for example, illustrate how a user can toggle on and off virtual light sources. FIG. 6A illustrates a virtual lighting design with only downlights "on"—note that the box for downlights of user interface 7001 is checked—whereas FIG. 6B illustrates only uplights (i.e., lights directed to a space above a target area or otherwise generally away from the target area) "on", and FIG. 6C illustrates both "on" (note both boxes of user interface 7001 are checked). This, coupled with the ability to freely orbit about the 3D space, is particularly useful when evaluating gaps in lighting coverage in space rather than at a point on a 2D plane; note how lighting coverage seems adequate from FIGS. 6A and B, but it appears as if there might be a gap in coverage when the two are combined (see FIG. 6C). This gap can impact playability (see FIG. 12)—which may prompt a user to switch to object visibility mode to further evaluate playability.

Figure 9A:
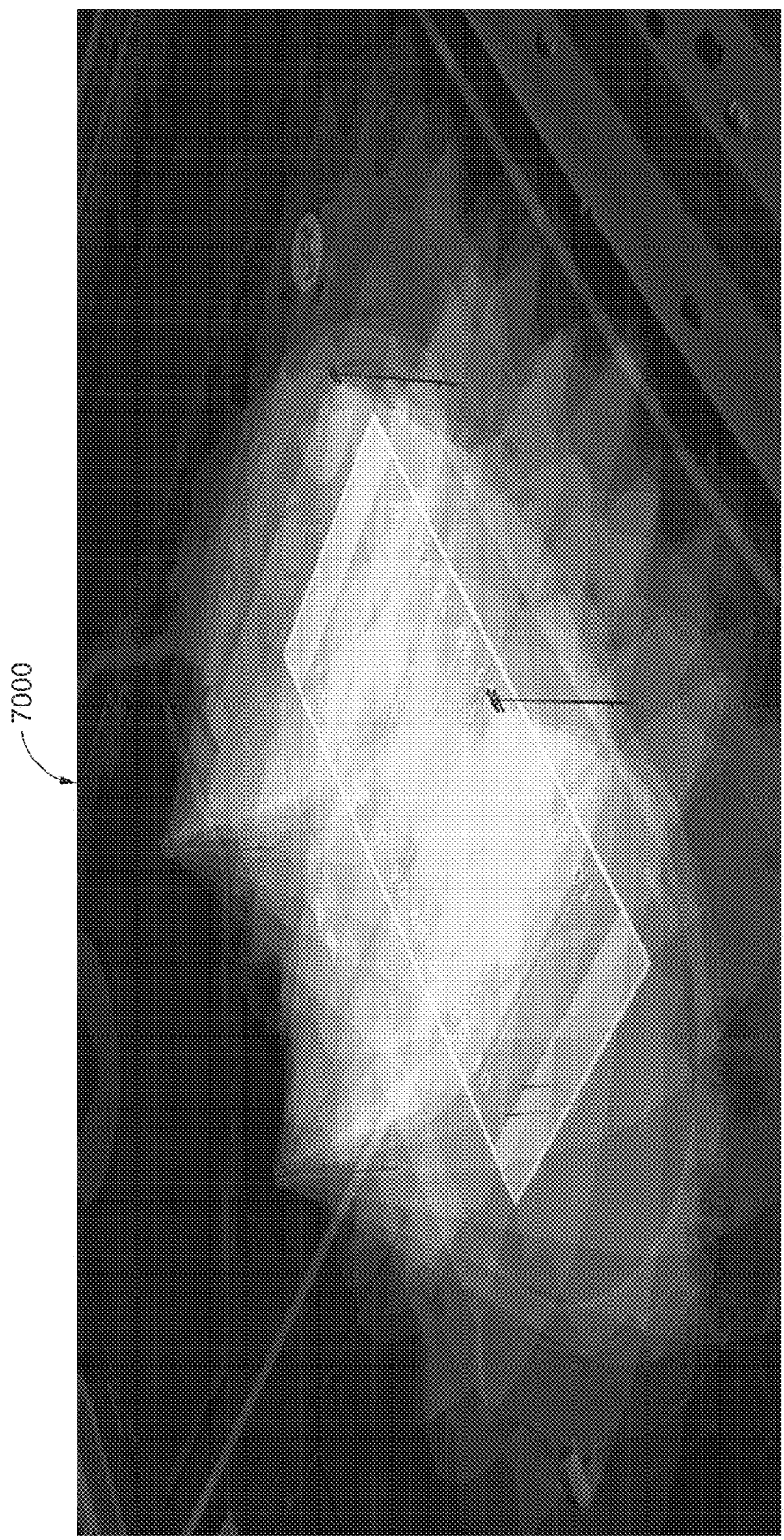
Figure 9B:
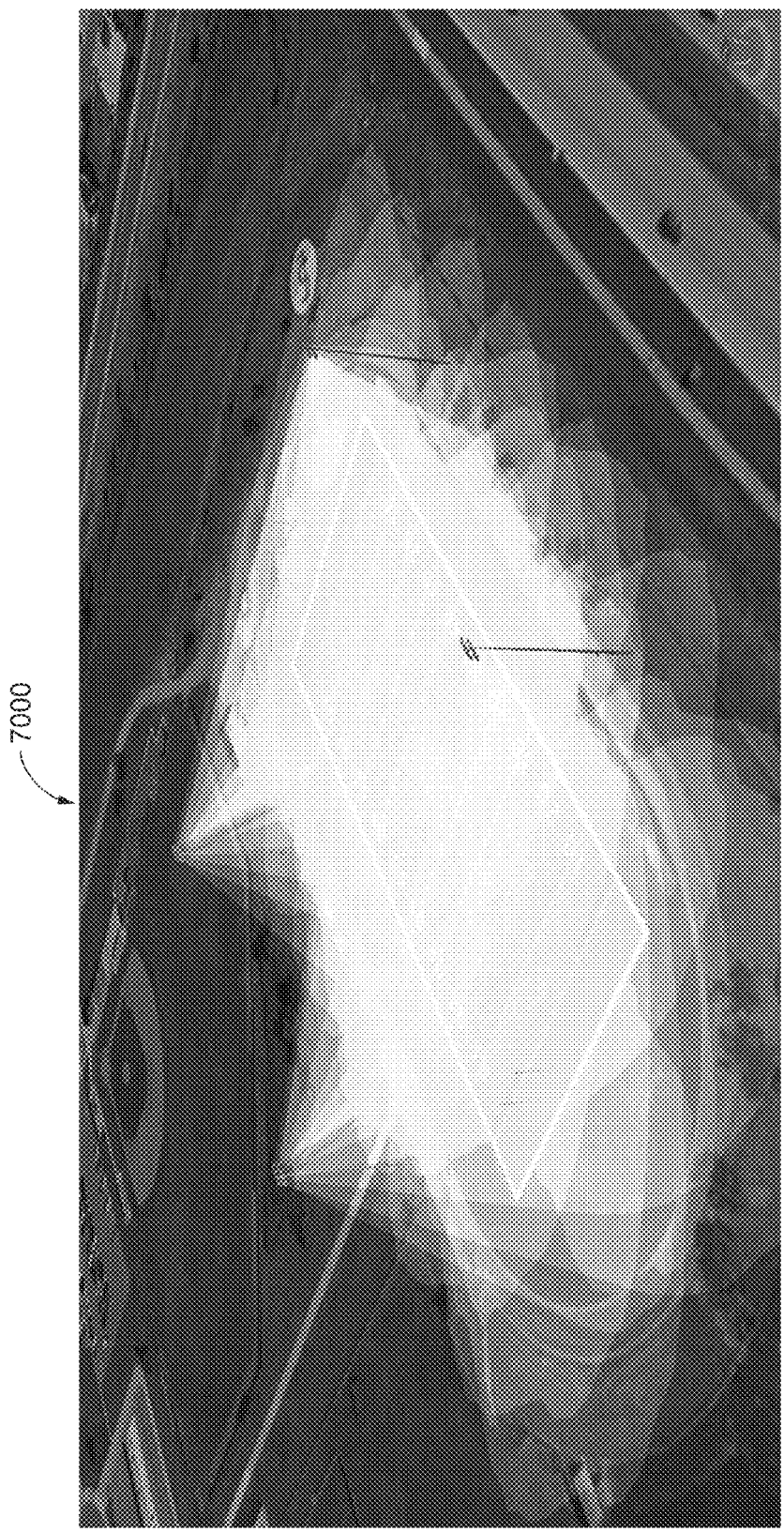

As envisioned, a user can set the candela level threshold (see the dropdown box of user interface 7001); candela level can be set in accordance with preference, emerging science, or otherwise. Light levels at the field of play are highly regulated and well defined, but how much light is needed in an uplight scenario is not yet agreed upon at a regulatory level, and so providing some degree of structure, yet some selectivity makes sense. Some non-limiting examples of why the candela threshold may be adjusted (up or down) include advances in glare science, feedback from users of the actual or similar actual lighting systems, empirical data, as a response to changes in ambient lighting at the actual site (e.g., a car dealership being built next to the sports field), or simple lighting designer preference. FIGS. 9A and B illustrate a perspective view of composite image 7000 set at 50,000 and 20,000 candela, respectively. As can be seen, FIG. 9B appears brighter even though the candela level is set lower. This increase in saturation (i.e., because more 3D virtual representations of light meet the threshold requirement and therefore may be layered on the base image) can sometimes lead a user to make the conclusion that areas of the modeled space that are more saturated are brighter than less saturated areas where the base image is still viewable—which is a logical conclusion and oftentimes valid—but it is important to note that a saturated area of the virtual lighting design might still fail to meet lighting requirements in an actual lighting system if the virtual lighting design has not been at least preliminarily vetted at step 1001 of method 1000. This is another reason why some choices in user interface 7001 have preset options that are selectable from a dropdown menu instead of manual entry with no boundaries; but, of course, this could differ.

Figure 7A:
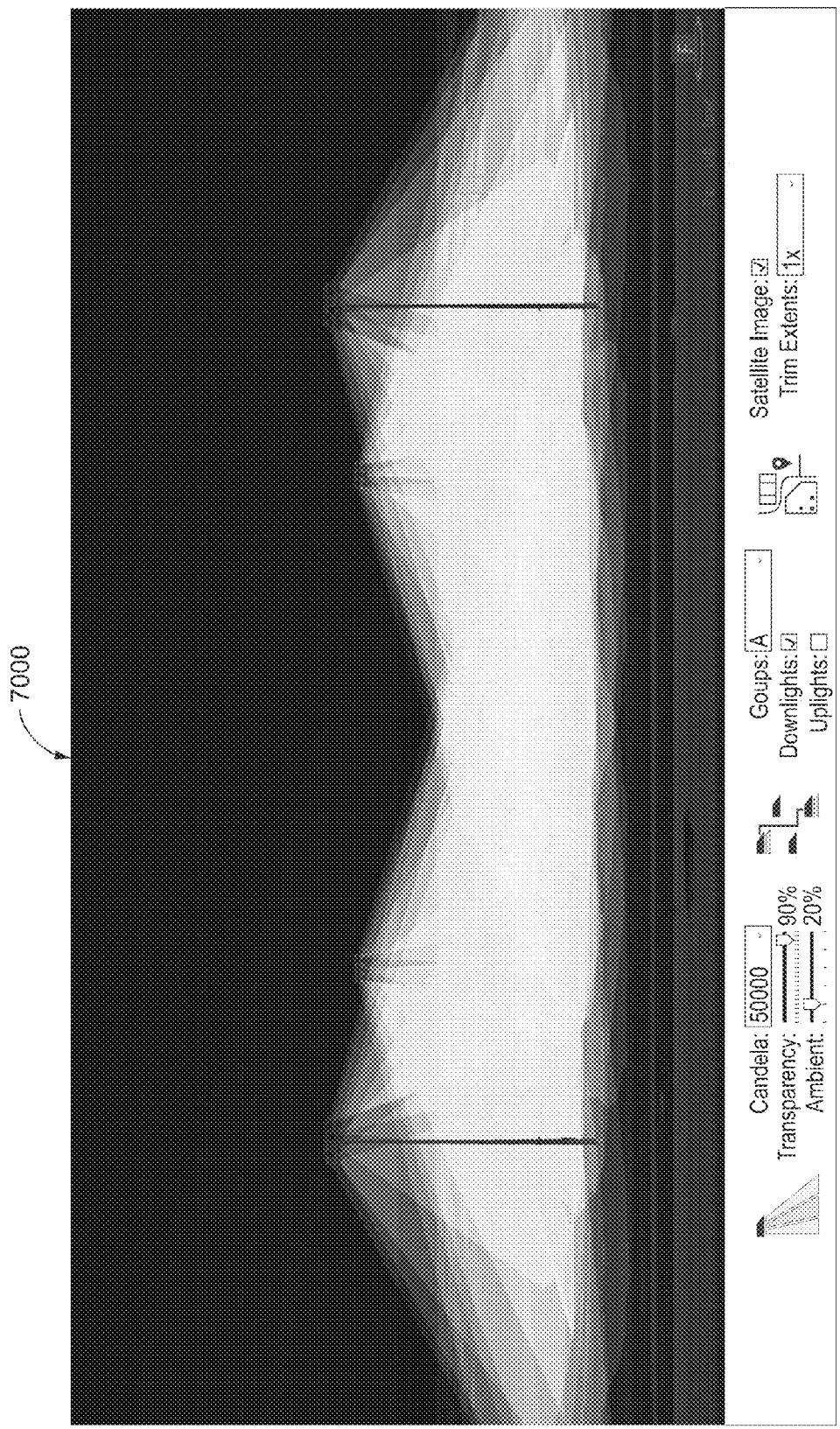
Figure 7B:
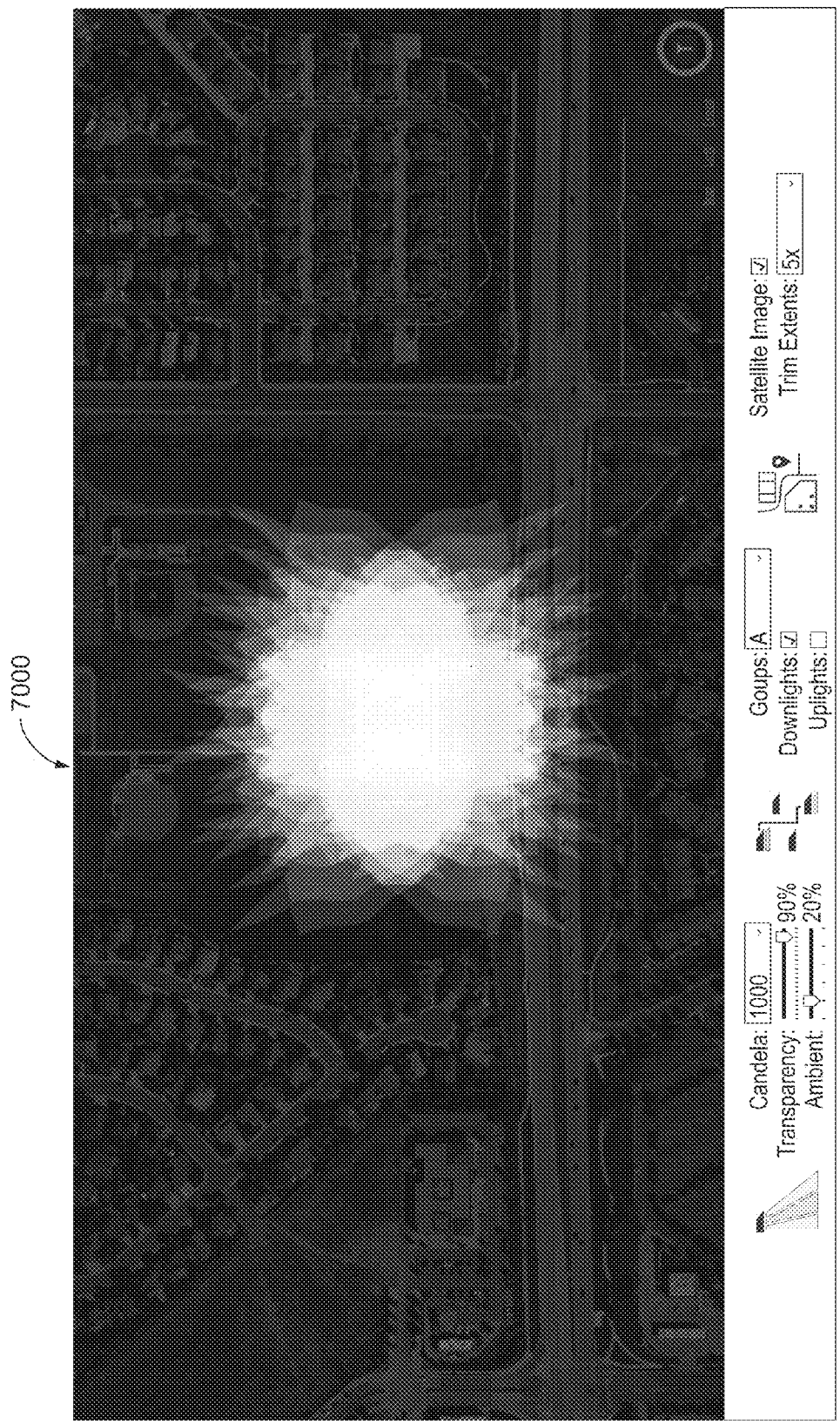
Figure 8A:
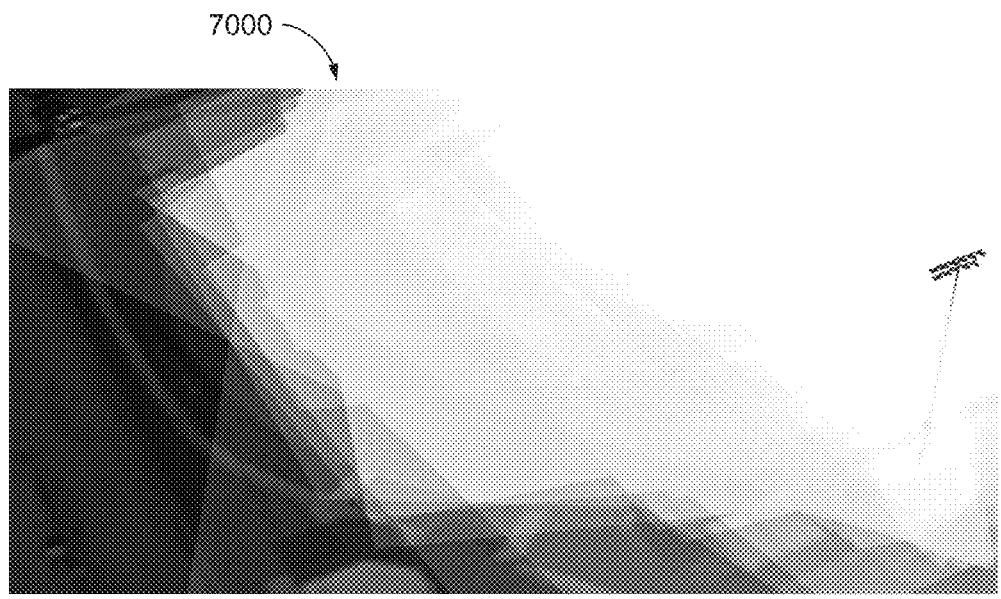
Figure 8B:
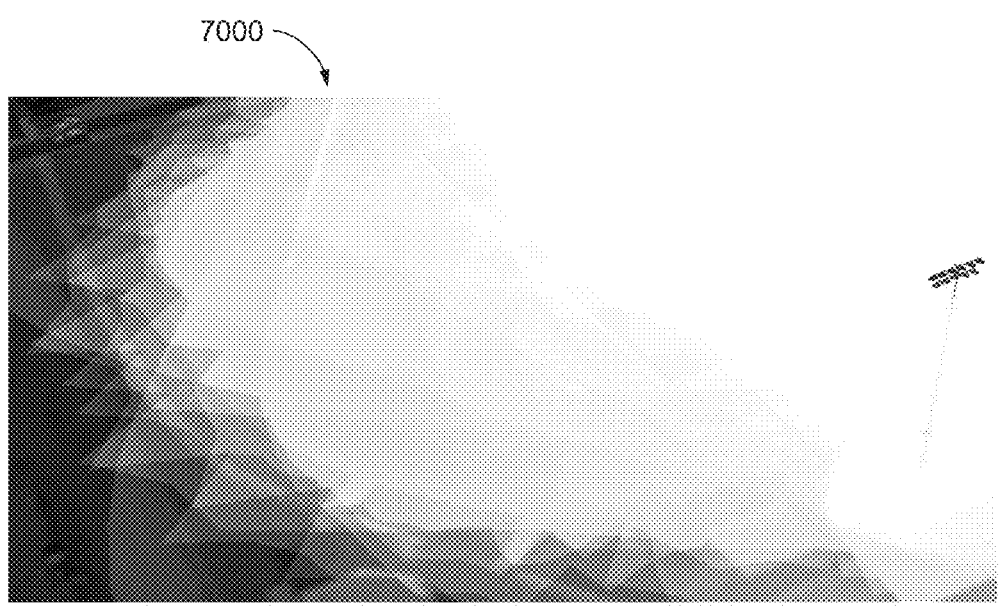
Figure 10A:
Figure 10B:
Figure 11:
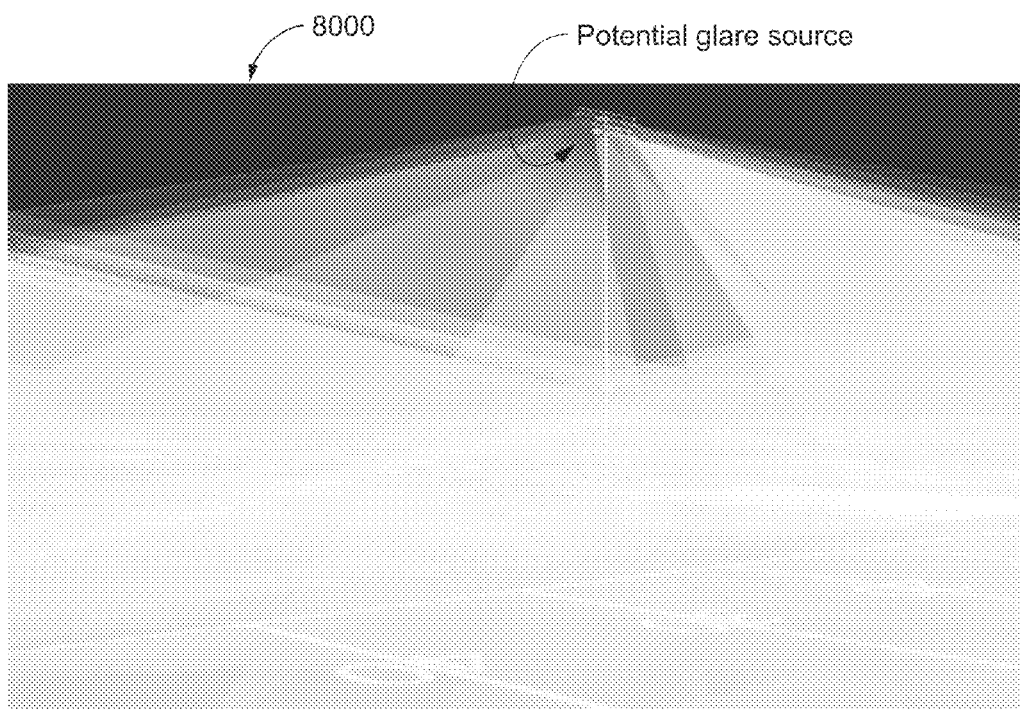
FIG. 11 illustrates a screenshot which shows an optional layer on the composite image which is useful, for example, to show potential glare sources; here, in the form of a colored overlay.

FIGS. 7A and B illustrate different preset views which can be toggled through by a user; here, a midfield view and a top view. Different views are useful, for example, in evaluating offsite glare and spill light—particularly when a satellite image layer 4000 is included for real-world context. Preset positions could be based on sport, level of play, user preference, or otherwise; and, of course, free orbiting to a position is also possible in accordance with method 1000. Resolution can even be refined (see FIG. 8A with a coarser resolution and faster processing speed as compared to FIG. 8B with a finer resolution and a slower processing speed) so that a user can engage in true 3D evaluation of virtual light near property lines, near spectator seating, and the like. If visibility or resolution is still insufficient, the entire composite image (or just one layer) could be brightened or darkened—compare FIG. 10B versus FIG. 10A. User adjustment of overall light level is useful because real-world target areas change—residences go up, street lighting is installed, and a variety of other things could happen which could impact ambient light levels, and which can be accounted for in modifying the relative brightness of one or more layers of the composite image (even if no change is made to the photometry). These features are all generally selectable in user interface 7001.

Ideally, the virtual lighting design will be satisfactory after one or more evaluations according to step 1004 of method 1000, but it is possible more is needed, or simply that a user or lighting designer desires more information at the virtual light source level (regardless of whether a virtual light source is a single source, multiple sources, a whole luminaire, etc.). If desired, a user (e.g., via user input devices 2003) may choose to add an optional layer 8000 to the composite image to provide more in-depth or additional evaluation according to step 1004. The look of composite layer 8000 may differ depending on what is being evaluated and in which mode (e.g., perceived glare in beam visibility mode and playability in object visibility mode). For example, if in beam visibility mode, composite layer 8000 might comprise a colored overlay in which any virtual light source within a defined field of view (predefined or freely orbited to) for the observer position (whether toggled to or freely orbited to) which meets a threshold level for potential glare is colored to indicate an undesirable aiming angle—here, colored red (e.g., to indicate a likelihood of disability glare). The candela-based threshold for perceived glare may be based on user input, advancements in glare science, or generally on principles discussed in aforementioned incorporated U.S. patent application Ser. No. 14/724,451 (now U.S. Pat. No. 9,786,251), for example. Alternatively, if in object visibility mode, composite layer 8000 might comprise indicia (8001, FIG. 13B) which identifies virtual light sources and/or their aiming angles which contributed the most light in the illuminance calculation earlier described (i.e., contributed the most light to the rectangle of FIGS. 13A and B, said rectangle representing a particular player position (i.e., left field) and a particular line of sight (i.e., towards the batter)). Quite simply, the virtual sources which contribute the most light to the illuminance calculation can be tweaked the least and still provide a large potential increase in playability. It is important to remember that a lighting design (virtual or actual) is sometimes the composite of the light output from hundreds of sources, all working together to build up a desired light level, shape, color, uniformity, etc. —and wildly re-aiming any one fixture (virtual or otherwise) can take the design out of compliance with regulations or result in a harsh aesthetic. Thus it was decided to identify the virtual light sources which contribute the most light to the illuminance calculation rather than, for example, those which contributed the least but could be re-aimed the most. In this sense layer 8000 can identify "problem" virtual light sources (e.g., those which pose a glare concern), or identify potentially "helpful" virtual light sources (e.g., those which can provide the best playability for the least re-aiming); in either mode layer 8000 identifies important virtual light sources.

In practice, a lighting designer can simulate actual playing conditions for players and identify a number of potential issues with virtual light sources—which, again, could be defined in accordance with current lighting standards, advances in glare or lighting science, testing, or personal preference, for example—all are contemplated according to the present embodiment.

C. Options and Alternatives

Ultimately, the invention may take many forms and provide many benefits. To give some sense of some options and alternatives which could provide further benefits, a few examples are given below.

Figure 15A:
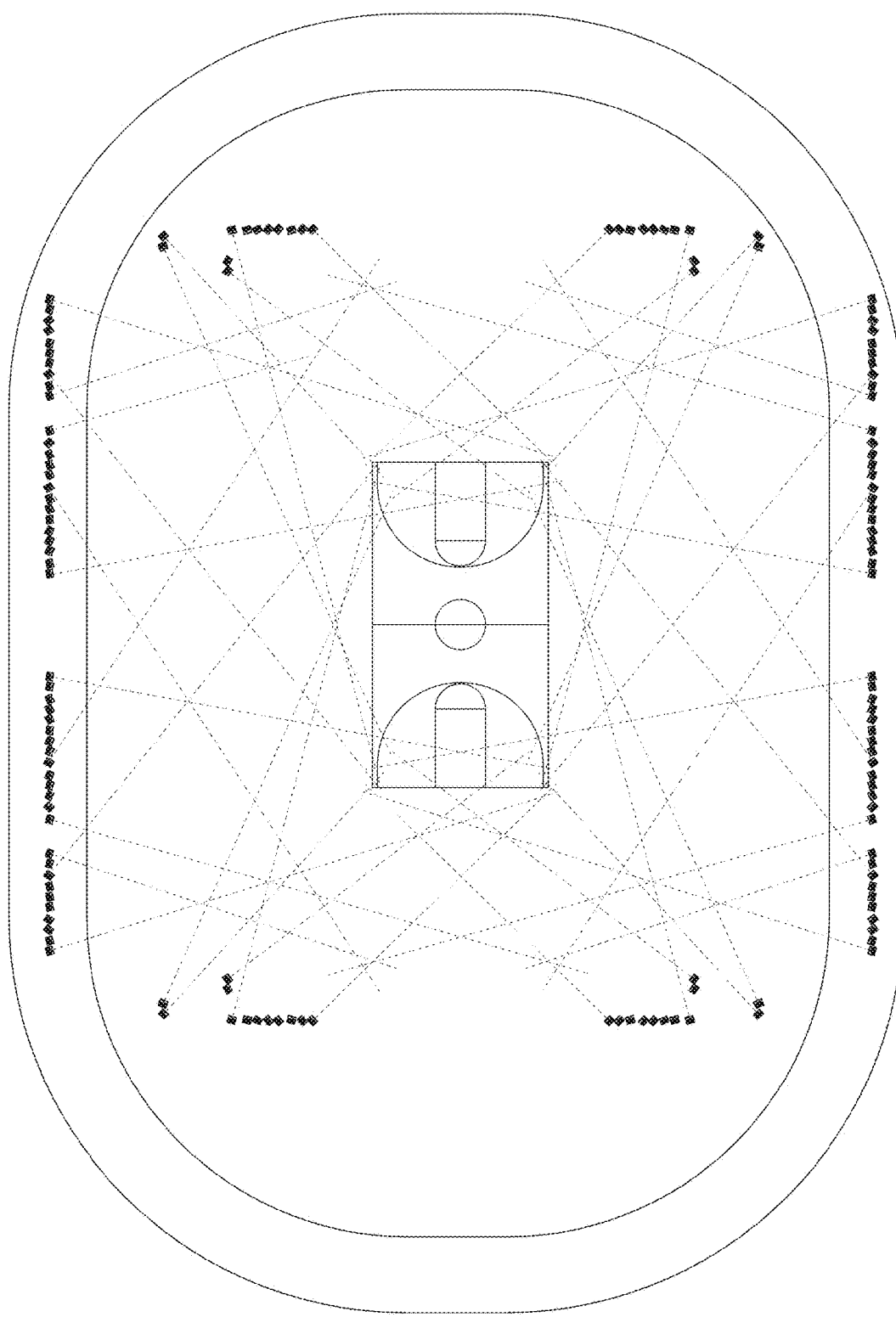
Figure 15B:
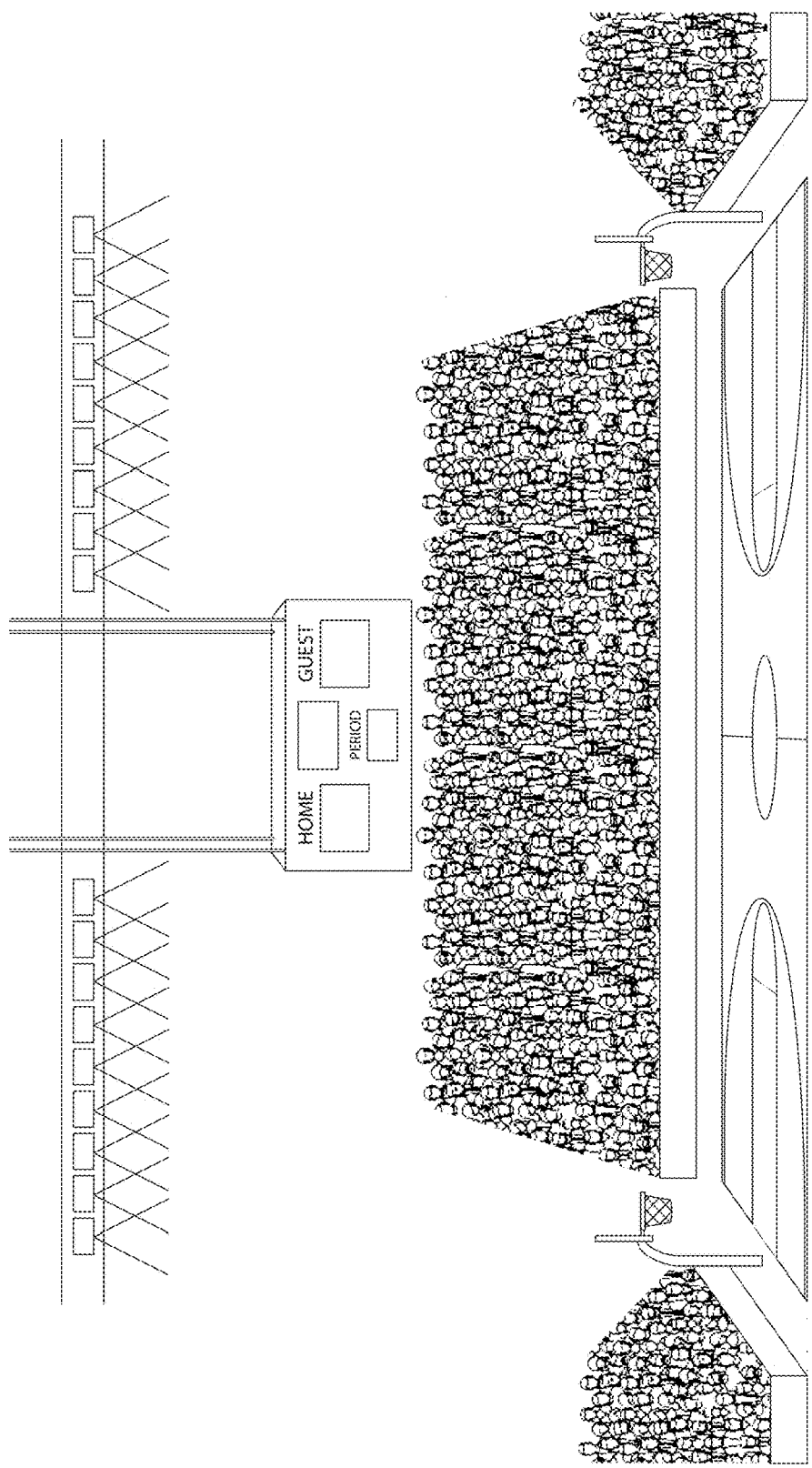
Figure 15C:
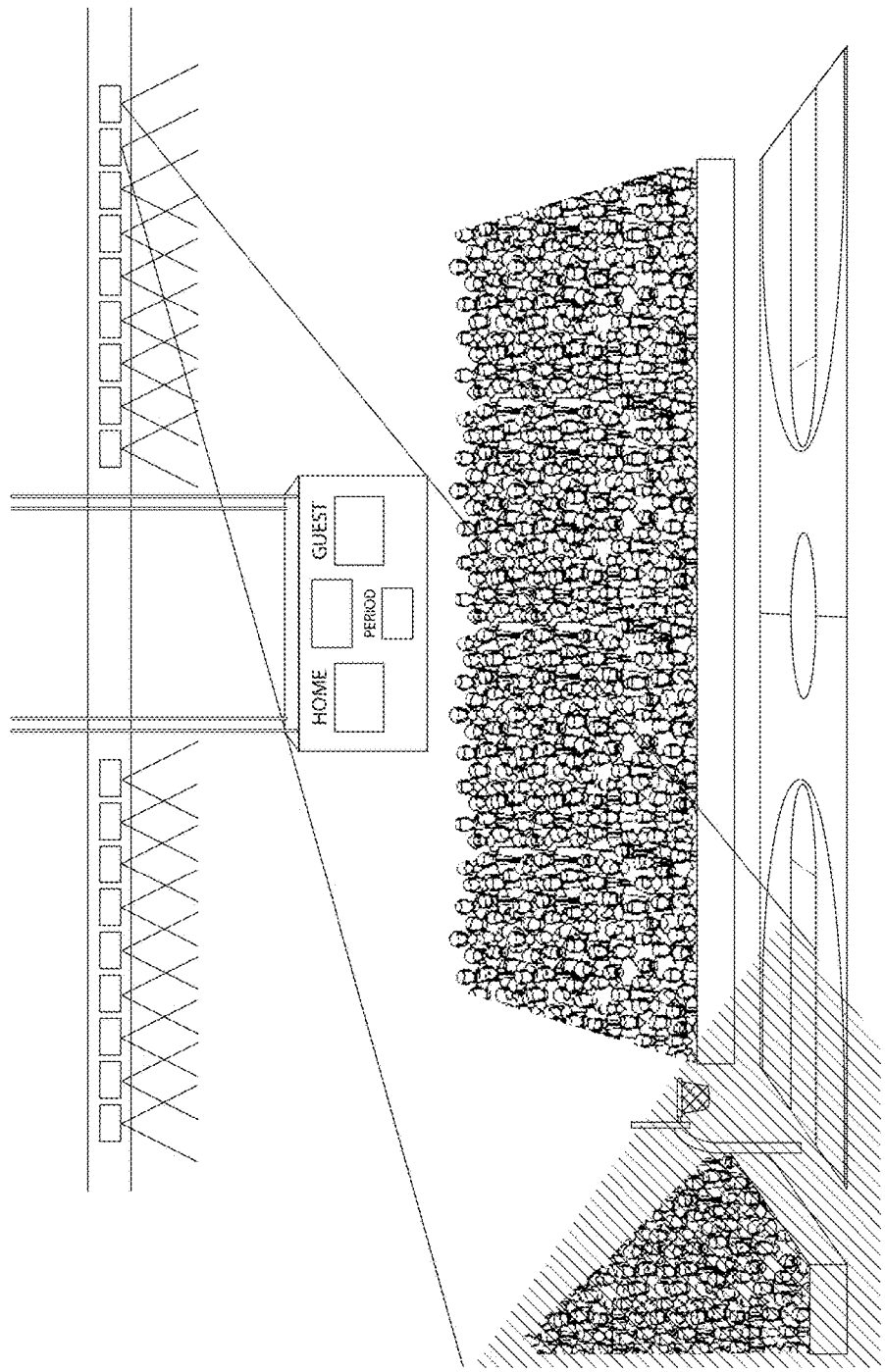
Figure 15D:
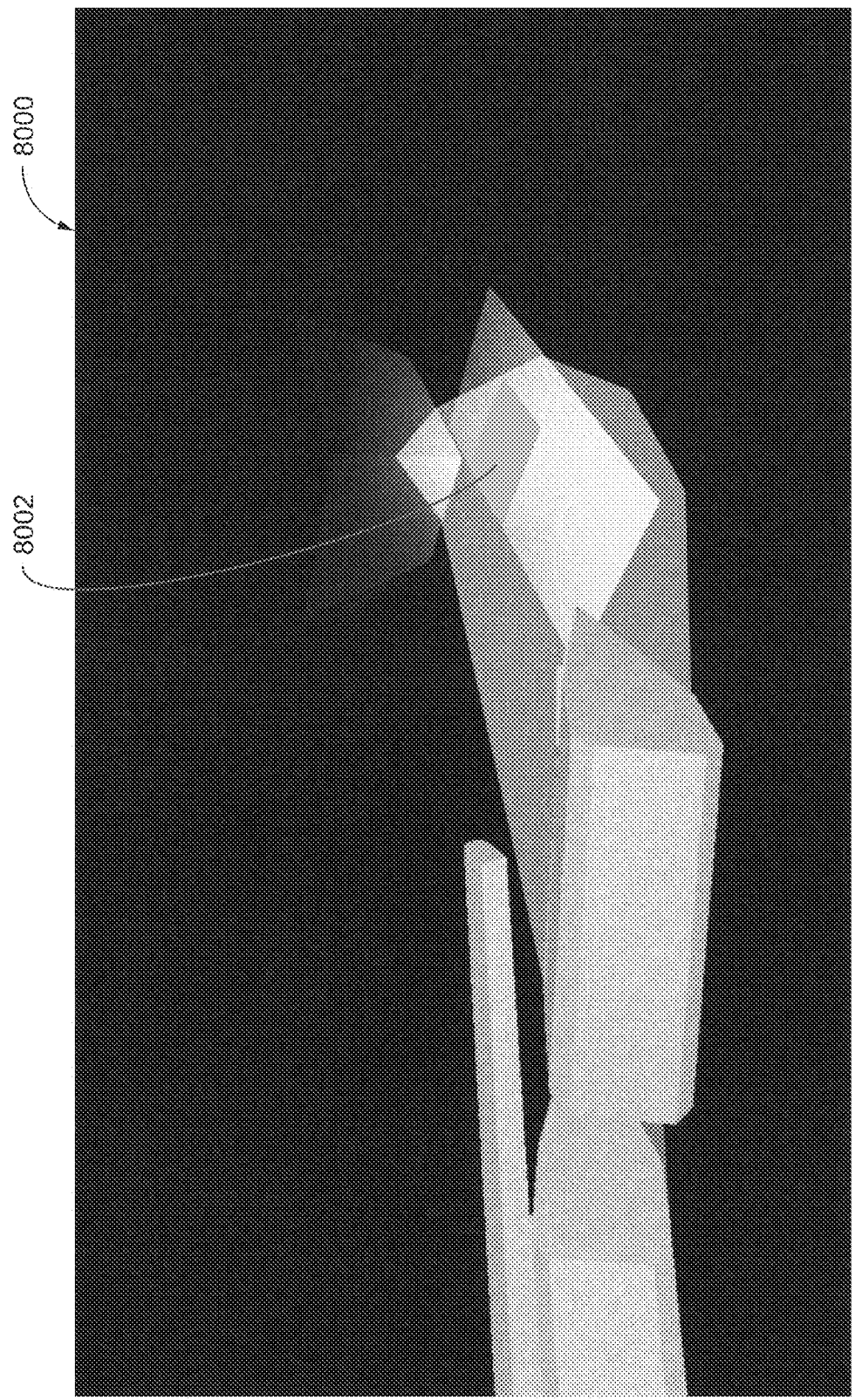

As previously stated, there may be a benefit to extending the geometry of any of the components of the virtual lighting system, including objects not relating to the lighting system but with the potential to interfere with light projected from the virtual lighting system. A floor plan or lighting scan-type view of a basketball court in an arena (FIG. 15A) illustrates what appears to be a typical lighting system (e.g., fixtures affixed to a catwalk-type structure and adapted to provide lighting and perhaps theatrical effects); a limited number of aiming directions/points are diagrammatically illustrated by dotted lines projecting outwardly from the virtual light sources (shown here as black squares panned to their general horizontal orientation). Despite what appears to be an adequate lighting system when looking only at the court, one need only to look at a different perspective (FIG. 15B) to see that an object suspended in the space above the target area may cast an undesired shadow (FIG. 15C). According to the present invention, the scoreboard of FIGS. 15A-C could be omitted from the lighting design tool described herein, or if desired, optional layer 8000 could be selected. As can be seen from FIG. 15D, instead of a color overlay which indicates potential glare sources or virtual source which contribute too much or too little direct light to a ball in flight, layer 8000 could comprise a shadow layer; namely, a layer which reduces visibility or saturation or otherwise provides a strong visual cue that light is reduced. Said shadowing 8002 is perspective specific—calculated based on position and viewing angle (as with most calculations according to the present invention). In this sense, optional layer 8000 could be included to evaluate light blockage instead of glare or playability.

With further regards to options and alternatives, at least two modes for projecting virtual representations have been discussed; the look, feel, threshold values, and user interface for these modes could differ from those described and illustrated and not depart from at least some aspects according to the present invention. Also, aspects of the present invention are not limited to evaluating only playability, glare, and gaps in lighting; are not limited to the particular apparatuses described herein; and are not limited to the particular subject matter of the screenshots presented herein. For example, one may use the present invention solely to evaluate photometric interference between fixtures lower and higher in an array (e.g., to determine if light from the luminaire higher in the array may strike the one lower in the array and cause onsite glare), or solely to see if there is any spill light (i.e., light which spills out past the target area). As another example, handheld devices and meters might be used instead of a computer. As yet another example, the present invention might model light sources not illuminating the target area—for example, if a sports field was next to a car dealership it may be worthwhile to represent the fact that there is significant background luminance. And, of course, the lighting application itself may not include sports fields— aspects of the present invention could be equally applied to indoor or other lighting applications.

Lastly, it has been stated that an object in flight (e.g., a baseball) is seen from many different player positions, and that the ball can also be "lost"—even with adequate downlight (i.e., light directed primarily towards a plane (e.g., a playing field))—if the ball is not adequately illuminated over its entire flight; hence, the disclosed object visibility mode and hemispherical illuminance calculation (with corresponding virtual representations). However, a ball can also be "lost" in flight when it passes in front of a light source due to a temporary lack of contrast. As such, object visibility mode could be expanded to include consideration of contrast ratio. The same color coding as in the rest of object visibility mode would apply, as would the principle of calculations specific to a player position, viewing direction, and trajectory. The difference lies in the calculation—rather than a hemispherical illuminance calculation a contrast ratio would be calculated. As envisioned, such a calculation would be based on luminance and would likely rely on the well known Michelson Contrast equation with a contrast ratio of 2:1 dividing red and yellow zones, and 3:1 dividing yellow and green zone; alternatively, the simpler Weber Contrast (also well known) could be used.

What is claimed is:

1. A method of producing virtual representations of light in a virtual 3D space comprising:
   a. generating an initial virtual 3D space;
   b. defining a virtual target area within the initial virtual 3D space;
   c. defining locations and aiming angles for one or more virtual light sources within the initial virtual 3D space, each virtual light source having corresponding photometry;
   d. generating a virtual representation of light within the initial virtual 3D space for each virtual light source along each defined aiming angle from each defined location, said virtual representations of light having a color determined, at least in part, by (i) the corresponding photometry, (ii) a defined trajectory of a virtual object in flight within the virtual 3D space, and (iii) a curvature of said virtual object in flight within the virtual 3D space;

e. such that a final virtual 3D space is generated which includes the virtual target area and a colored composite of generated virtual representations of light.

2. The method of claim 1 wherein the virtual target area includes a 2D plane and a 3D space proximate the 2D plane.

3. The method of claim 1 wherein the virtual representations of light are modified at any point the photometry intersect the trajectory along a defined viewpoint.

4. The method of claim 3 wherein the modification of the virtual target area comprises modifying color, saturation, or perceived brightness.

5. The method of claim 1 wherein the virtual representations of light are colored representations of light incident on said virtual object in flight based on flux values of the corresponding photometry and hemispherical illuminance.

6. The method of claim 1 wherein the method further comprises:
   a. identifying one or more undesirable lighting conditions;
   b. setting a threshold relating to said undesirable lighting conditions;
   c. identifying any portion of the colored composite of generated virtual representations of light which exceeds said threshold; and
   d. identifying said portions or the corresponding virtual light sources differently than the remaining portions of the colored composite of generated virtual representations of light.

7. The method of claim 6 wherein the undesirable lighting condition comprises perceived glare, and wherein the step of identifying any portion of the colored composite which exceeds said threshold or the corresponding virtual light sources comprises identifying any virtual light source which causes perceived glare at a defined position and viewing angle relative the virtual target area, and wherein the step of identifying said portions differently than the remaining portions of the colored composite comprises (i) coloring said identified virtual light sources a different color than the remaining portions of the colored composite or (ii) provide indicia indicating said identified virtual light sources.

8. The method of claim 6 wherein the undesirable lighting condition comprises a lack of playability, and wherein the step of identifying any portion of the colored composite which exceeds said threshold or the corresponding virtual light sources comprises identifying any virtual light source which contributes a defined illuminance to an object in flight in the final virtual 3D space, and wherein the step of identifying said portions differently than the remaining portions of the colored composite comprises (i) coloring said identified virtual light sources a different color than the remaining portions of the colored composite or (ii) otherwise visually indicating said identified virtual light sources.

9. A method of producing virtual representations of light in a virtual 3D space comprising:
   a. generating a virtual 3D space;
   b. generating a virtual target area within said 3D space including a 2D plane and a 3D space above said 2D plane;
   c. generating a first set of virtual light sources which illuminate said 2D plane of said virtual target area;
   d. generating a second set of virtual light sources which illuminate said 3D space above said 2D plane of said virtual target area;
   e. generating virtual representations of said illumination of said first and second set of virtual light sources; and
   f. selectively hiding any of the virtual representations of illumination of said first and second set of virtual light sources; and
   g. modifying said virtual representations, said virtual target area, or said virtual 3D space to indicate undesirable lighting conditions at the virtual target area wherein the undesirable lighting conditions comprise gaps between said virtual representations of illumination of the 2D plane and the 3D space of said virtual target area that intersect with a defined trajectory across the virtual 3D space; and wherein
   h. the modifying said virtual representations, said virtual target area, or said virtual 3D space to indicate said undesirable lighting conditions comprises one or more of:
      i. coloring some portion of the virtual light sources, virtual representations of illumination, or virtual target area illuminated by said virtual representations of illumination; and
      ii. providing indicia identifying important virtual light sources, virtual representations of illumination, or portions of the virtual target area illuminated by said virtual representations of illumination.

* * * * *